United States Patent
Keyworth et al.

(10) Patent No.: US 9,866,315 B2
(45) Date of Patent: Jan. 9, 2018

(54) SUPER-CHANNEL MULTIPLEXING AND DE-MULTIPLEXING USING A PHASED ARRAY SWITCHING ENGINE

(71) Applicant: Lumentum Operations LLC, Milpitas, CA (US)

(72) Inventors: Barrie Keyworth, Stittsville (CA); John Michael Miller, Gatineau (CA); Andrew Parks, Ottawa (CA); Dan Burke, Ottawa (CA); Peter David Roorda, Ottawa (CA); Brandon C. Collings, Middletown, NJ (US); Brian Smith, Stittsville (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/136,675

(22) Filed: Apr. 22, 2016

(65) Prior Publication Data

US 2016/0316281 A1  Oct. 27, 2016

Related U.S. Application Data

(60) Provisional application No. 62/152,141, filed on Apr. 24, 2015.

(51) Int. Cl.
 *H04J 14/02* (2006.01)
 *H04B 10/032* (2013.01)
 *H04Q 11/00* (2006.01)

(52) U.S. Cl.
 CPC ........ *H04B 10/032* (2013.01); *H04J 14/0212* (2013.01); *H04J 14/0213* (2013.01);
 (Continued)

(58) Field of Classification Search
 CPC .... H04J 14/0212; H04J 14/02; H04J 14/0221; H04Q 11/0003; H04Q 11/0005;
 (Continued)

(56) References Cited

U.S. PATENT DOCUMENTS 7,092,599 B2  8/2006  Frisken
7,725,027 B2  5/2010  Keyworth et al.
(Continued)

OTHER PUBLICATIONS

J. Schroder et al, "An Optical FPGA: Reconfigurable simultaneous multi-output spectral pulse-shaping for linear optical processing," https://www.osapublishing.org/oe/fulltext.cfm?uri=oe-21-1-690&id=248036, Jan. 7, 2013, 8 pages. G. Baxter et al, "Highly Programmable Wavelength Selective Switch Based on Liquid Crystal on Silicon Switching Elements," http://m.ece.queensu.ca/Current-Students/Graduate/Course-Homepages/ELEC863_Winter2011/files/Baxter_OFC2006_OTuF2.pdf, Mar. 5, 2006, 3 pages.
(Continued)

*Primary Examiner* — Hanh Phan
(74) *Attorney, Agent, or Firm* — Harrity & Harrity, LLP

(57) ABSTRACT

A method may include receiving, by a switching engine, an optical signal. The optical signal may carry a super-channel that includes a plurality of sub-carriers to be directed toward respective output ports. The switching engine may have a plurality of regions of pixels on which respective sub-carriers, of the plurality of sub-carriers, are incident. The method may include applying, by the switching engine, respective single beam steering gratings to first, overlapping, areas of the plurality of regions of pixels. The method may include applying, by the switching engine, one or more respective pluralities of beam steering gratings to second, overlapping areas of the plurality of regions of pixels. The method may include directing, based on the single beam steering gratings and the one or more pluralities of beam steering gratings, parts of the optical signal toward the respective output ports.

20 Claims, 12 Drawing Sheets

(52) U.S. Cl.
CPC ...... *H04J 14/0217* (2013.01); *H04Q 11/0005* (2013.01); *H04Q 11/0062* (2013.01); *H04Q 2011/003* (2013.01); *H04Q 2011/0026* (2013.01); *H04Q 2011/0037* (2013.01); *H04Q 2011/0081* (2013.01)

(58) Field of Classification Search
CPC .......................... H04Q 11/0067; G02B 6/3518; G02B 6/3514; G02B 6/3546
USPC ........ 398/79, 45, 48, 49, 83, 47, 85, 87, 82, 398/50, 53, 56, 55, 46, 59, 84; 385/24, 385/37, 16, 17, 18
See application file for complete search history.

(56) References Cited

U.S. PATENT DOCUMENTS

| | | |
|---|---|---|
| 7,787,720 B2 | 8/2010 | Frisken et al. |
| 8,081,875 B2 | 12/2011 | Keyworth et al. |
| 8,300,995 B2 | 10/2012 | Colbourne |
| 8,705,960 B2 | 4/2014 | Colbourne |
| 2010/0027995 A1* | 2/2010 | Farley ............... G02B 6/351 398/49 |
| 2010/0150558 A1* | 6/2010 | Wisseman .......... H04J 14/0212 398/79 |
| 2012/0219293 A1* | 8/2012 | Boertjes ............. H04J 14/0204 398/48 |
| 2013/0209031 A1 | 8/2013 | McLaughlin et al. |
| 2014/0255026 A1 | 9/2014 | Roorda et al. |
| 2016/0315697 A1 | 10/2016 | Breukelaar et al. |

OTHER PUBLICATIONS

T. Zami, "Can the limits of the 'contentionless' add/drop stages degrade importantly the benefit of superchannels in the WDM networks?," https://www.researchgate.net/publication/295148583_Can_the_limits_of_the_contentionless_adddrop_stages_degrade_importantly_the_benefit_of_superchannels_in_the_WDM_networks, Sep. 21, 2014, 3 pages.

M. Roelens et al., "Applications of LCoS-Based Programmable Optical Processors," https://www.osapublishing.org/oe/fulltext.cfm?uri=oe-21-1-690, 2014, 3 pages.

X. Wang et al., "A Hitless Defragmentation Method for Self-optimizing Flexible Grid Optical Networks," http://grid.cs.gsu.edu/cao/iwon/iWON13%20Node%20Arch%20Defrag%2020131202-1253_v2.pdf, Dec. 9, 2013, 17 pages.

P.D. Colbourne et al., "ROADM Switching Technologies" in Optical Fiber Communication Conference, OSA Technical Digest, Optical Society of America, Paper OTuD1, 2011, 43 pages.

X. Lui et al., "Superchannel for Next-Generation Optical Networks," in Optical Fiber Communication Conference, OSA Technical Digest, Optical Society of America, Paper W1H.5, 2014, 33 pages.

Roelens et al., "Applications of LCoS-Based Programmable Optical Processors", Optical Fiber Communication Conference. Optical Society of America, Mar. 9, 2014, 3 pages.

Schröder et al., "An Optical FPGA: Reconfigurable Simultaneous Multi-Output Spectral Pulse-Shaping for Linear Optical Processing", Opt. Express 21, Jan. 7, 2013, pp. 690-697.

* cited by examiner

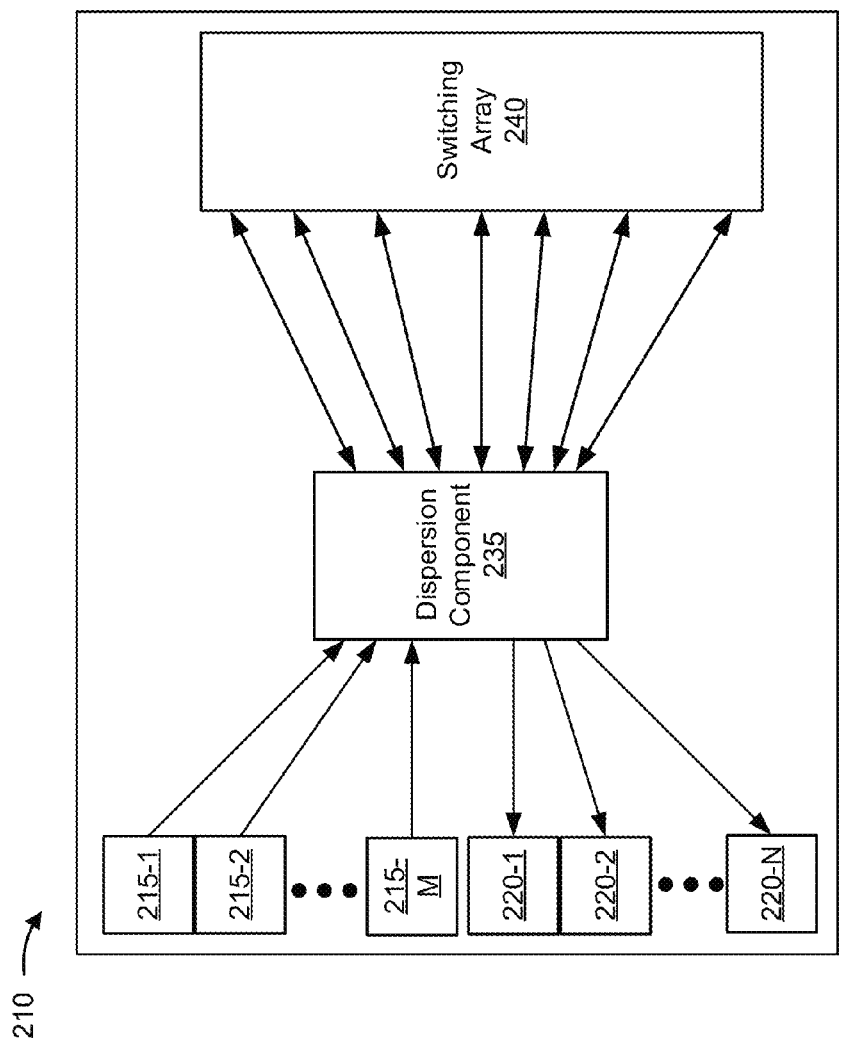

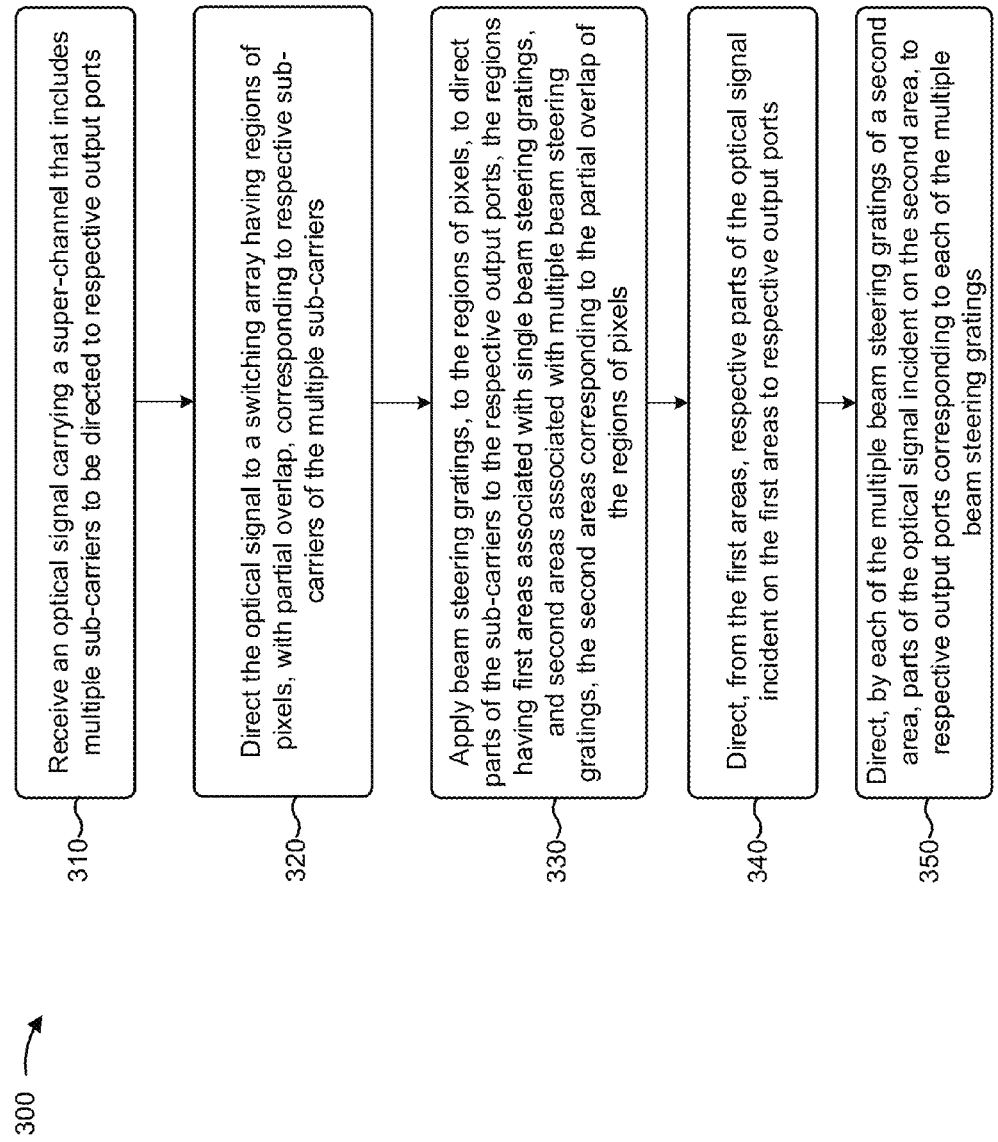

SUPER-CHANNEL MULTIPLEXING AND DE-MULTIPLEXING USING A PHASED ARRAY SWITCHING ENGINE

RELATED APPLICATION

This application claims priority under 35 U.S.C. §119 to U.S. Provisional Patent Application No. 62/152,141, filed on Apr. 24, 2015, the content of which is incorporated by reference herein in its entirety.

TECHNICAL FIELD

The present invention relates to devices and systems for communication in an optical network. More particularly, the present invention relates to systems and methods for multiplexing and de-multiplexing optical signals using programmable beam steering gratings.

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

Reconfigurable optical add-drop multiplexers (ROADMs) have seen increasing usage as optical nodes. An optical network that is implemented using ROADMs can be reconfigured without physical modification of components of the ROADMs, which improves flexibility and peak bandwidth of the optical network. A ROADM may include a wavelength selective switch (WSS), which includes a switching engine that routes optical signals to particular output ports based on wavelengths of the optical signal.

As traffic demand increases in optical fiber, there is an increasing usage of higher-order coherent modulation formats such as DP-8QAM and DP-16QAM, which may drive commensurate improvements in optical signal-to-noise ratio (OSNR). For these spectral efficiency improvements to be possible, OSNR degradations should be reduced or avoided. One way to combine/split sub-carriers of a super-channel into/from a WSS ROADM is to use an external passive 1×N coupler (or multicast switch) prior to connection to a WSS. In such a case, the deployed WSS 'channel' slot may have a bandwidth approximately equal to the sum of the baud rates of the sub-carriers. Such a 1×N coupler/splitter may introduce significant insertion loss at both transmit and receive, which drives the use of additional optical amplifiers in the path and, thus, degrades the achievable OSNR and reach. Where amplifiers are used to boost sub-carrier output power prior to multiplexing, broadband ASE (Amplified Spontaneous Emission) noise may accumulate in a passive coupler which could degrade OSNR by 10×log(N), where N is the number of ports combined in the coupler.

It would be advantageous to be able to create spectrally efficient super-channels in an optical network without suffering significant insertion loss. It would be advantageous to be able to create spectrally efficient super-channels in a WSS from optical channels provided on different input ports without physically reconnecting inputs to the WSS. It would be advantageous to be able to de-multiplex spectrally efficient super-channels in an optical network without suffering significant insertion loss.

SUMMARY

According to some possible implementations, a method may include receiving, by a switching engine, an optical signal. The optical signal may carry a super-channel that includes a plurality of sub-carriers to be directed toward respective output ports. The switching engine may have a plurality of regions of pixels on which respective sub-carriers, of the plurality of sub-carriers, are incident. The plurality of regions of pixels may include first areas that do not include overlap between any two regions of pixels, of the plurality of regions of pixels. The plurality of regions of pixels may include one or more second areas that include overlap between regions of pixels of the plurality of regions of pixels. The method may include applying, by the switching engine, respective single beam steering gratings to the first areas. The method may include applying, by the switching engine, one or more respective pluralities of beam steering gratings to the one or more second areas. The method may include directing, based on the single beam steering gratings and the one or more pluralities of beam steering gratings, parts of the optical signal toward the respective output ports.

According to some possible implementations, a method may include receiving a plurality of optical channels on multiple input ports to be directed to an output port to form a super-channel. The method may include directing the plurality of optical channels to a switching array. The plurality of optical channels may be associated with a corresponding plurality of regions of pixels of the switching array. At least two regions of pixels, of the plurality of regions of pixels, may be partially overlapped. The method may include applying a plurality of beam steering gratings to the corresponding plurality of regions of pixels. The plurality of beam steering gratings may include single beam steering gratings in first areas where the plurality of regions of pixels do not overlap. The plurality of beam steering gratings may include multiple beam steering gratings in one or more second areas where the plurality of regions of pixels overlap. The method may include directing, by the switching array and based on the plurality of beam steering gratings, part of the plurality of optical channels to the output port as the super-channel.

According to some possible implementations, an optical device may include an input port to receive an optical signal carrying a super-channel including a plurality of sub-carriers. The optical device may include a phased array switching engine to direct the plurality of sub-carriers to a switching array of the phased array switching engine. The plurality of sub-carriers may be associated with a respective plurality of regions of pixels of the switching array. First areas of the switching array may be associated with a single region of pixels corresponding to a single sub-carrier of the plurality of sub-carriers. Second areas of the switching array may be associated with overlapping regions of pixels corresponding to adjacent pairs of sub-carriers of the plurality of sub-carriers. The optical device may include an input port to apply, to the switching array, beam steering gratings corresponding to the plurality of sub-carriers. The beam steering grating for a particular optical sub-carrier, of the plurality of optical sub-carriers, may be approximately coextensive with the region of pixels, of the plurality of regions of pixels, corresponding to the particular optical sub-carrier. The optical device may include an input port to apply, to direct, based on the beam steering gratings, parts of the plurality of optical sub-carriers to respective output ports.

BRIEF DESCRIPTION OF THE DRAWINGS

FIG. 2B is a diagram of an example M×N wavelength selective switch that may be included in a reconfigurable optical add-drop multiplexer;

FIG. 3 is a flow chart of an example process de-multiplexing a super-channel using a phased array switching engine.

DETAILED DESCRIPTION

Figure 1A:
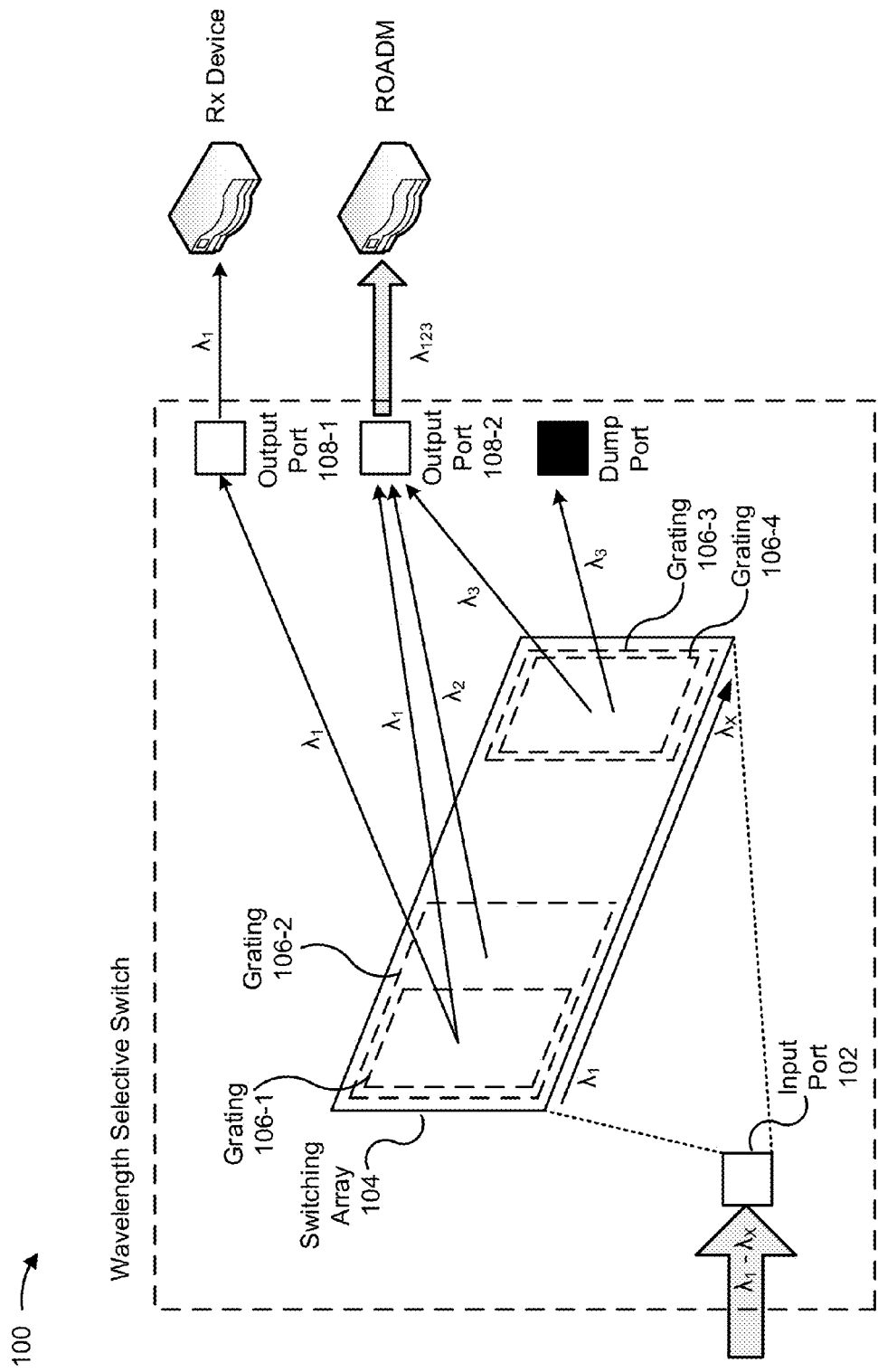
FIGS. 1A-1H are diagrams of an overview of an example implementation described herein.

The following detailed description of example implementations refers to the accompanying drawings. The same reference numbers in different drawings may identify the same or similar elements.

An optical network may include optical nodes that route, carry, and/or provide network traffic via optical links using optical signals. In some cases, the optical nodes may include reconfigurable optical add-drop multiplexers (ROADM), which can add, drop, pass, or redirect modulated optical signals of various wavelengths, and which can be reconfigured by a controller (e.g., a local controller, a remote controller, a network administrator device, etc.) to change treatment of optical signals by the optical network. A ROADM may include one or more wavelength selective switches (WSS) that can route an optical signal based on a wavelength of the optical signal. In some cases, a ROADM may include a component to multiplex or demultiplex optical signals, such as a 1×N WSS, an M×N WSS, a microelectromechanical mirror (MEMS) WSS, a liquid crystal (LC) WSS, a liquid crystal on silicon (LCoS) WSS, etc.), or the like.

An optical signal may include a single optical channel (also referred to herein as a channel or a carrier), or may include multiple optical channels that are multiplexed together using a wavelength division multiplexing (WDM) process, which increases the bandwidth that can be transmitted via an optical link. For example, an optical signal may include a WDM signal, a Coarse WDM (CWDM) signal, a Dense WDM (DWDM) signal, or other optical signals with one or more wavelength components. An optical channel may include an optical signal having data modulated on wavelengths around a center frequency. A wavelength component is a portion of an optical signal that is centered around a particular optical frequency.

When multiple optical channels are present, guard band is introduced between spectrally adjacent channels to reduce interference between channels. A guard band is a part of the frequency spectrum or bandwidth allocated for the purpose of preventing interference. For example, the guard band may include the minimum bandwidth or amount of frequency permitted between channels to reduce cross-talk between adjacent channels, which simplifies de-multiplexing and processing of the optical channels.

An example channel may provision 37.5 GHz of bandwidth for a 32 GHz bandwidth optical signal (corresponding to 32 gigabaud modulation) and 5.5 GHz of guard band. Typically, the channel is frequency centered within the provisioned bandwidth and thus the guard band is divided into two, typically equal, parts: one before the optical channel bandwidth, and one after the optical channel bandwidth. Accordingly, when two channels are spectrally adjacent, they are separated by, or their channel gap is, one guard band. A channel gap, as described herein, is a bandwidth or amount of frequency spectrum that is between spectrally adjacent channels. Furthermore, spectrally adjacent channels may be spaced at a particular channel spacing, which is a bandwidth or amount of frequency spectrum between center frequencies of spectrally adjacent channels.

In some cases, multiple optical channels may be multiplexed into a super-channel. A super-channel is a type of channel that includes multiple optical channels (called sub-carriers or sub-channels when they are in a super-channel) multiplexed together for transmission as a single optical channel. A difference between a super-channel and a channel may be the guard band. With a super-channel, the guard band between sub-carriers may be reduced relative to the guard band between adjacent channels that are not in a super-channel (i.e., the optical channels are more tightly packed in a super-channel than in an equivalent number of channels in a WDM signal). This improves spectral efficiency, allowing transmission of increasing amounts of data using less bandwidth as the guard band is reduced. Super-channels may be created without reduced guard band between sub-carriers, however such super-channels do not increase the spectral efficiency of the optical network.

When the guard band between sub-carriers is reduced to zero, the super-channel is said to have Nyquist channel spacing and is said to have higher spectral efficiency. For an example of the different spectral usage in a super-channel as compared to a series of single channels, refer to FIG. 1G, which is described in more detail below. In some implementations, a super-channel may include a guard band between edges of the super-channel and other spectrally adjacent super-channels.

As the guard band between two optical channels is reduced (whether or not those two optical channels are sub-carriers in a super-channel), the bandwidth occupied by the two optical channels may decrease or the channel spacing between center frequencies of adjacent sub-carriers may decrease. For example, if the two optical channels each transmits information at a modulation rate of 32 gigabaud (e.g., 32,000,000,000 symbols per second) occupying 32 gigahertz (GHz) of bandwidth, and there is a guard band of 5.5 GHz, then the required bandwidth is 75 GHz (e.g., 2*32 GHz+2*5.5 GHz). In contrast, a super-channel of the same two channels with no guard band between the two channels would use 69.5 GHz of bandwidth, corresponding to the two 32 GHz channels and the 2.25 GHz portions of the guard band at the lowermost and uppermost portions of the 69.5 GHz bandwidth. Thus the super-channel is more spectrally efficient than the two individual channels.

Implementations described herein permit a WSS that is capable of performing programmable multicast beam steering to create super-channels with zero guard-band spacing. A WSS that is capable of performing programmable multicast beam steering may include, for example, a WSS having an LCoS switching engine. As another example, a WSS that is capable of performing programmable multicast beam steering may include an LC or MEMS switching engine, or another switching engine technology that permits multicast beam steering at a granularity smaller than the size of a channel. For example, the WSS may include an optical phased array switching engine that can combine grating profiles on regions of pixels of the switching engine to implement multicast beam steering gratings. To create the super-channel with zero guard-band spacing, the WSS may use partially overlapping beam steering gratings implemented on regions of pixels corresponding to sub-carriers of the super-channel. When the overlap in multicast beam steering gratings correspond to Nyquist spaced optical channels, both OSNR is improved and degradation of the super-channel is reduced as compared to a passive combiner.

An LCoS based switching array or other phase based switching array permits closer channel spacing than a WSS that does not include a phased array switching engine, such as a MEMs WSS. Furthermore, the multicast beam steering gratings may be field-reconfigurable, thus increasing flexibility of the optical network and permitting adaptation to changing bandwidth or channel requirements. Still further, implementations described herein may be implemented in an existing LCoS based switching array using a firmware upgrade.

Figure 1B:
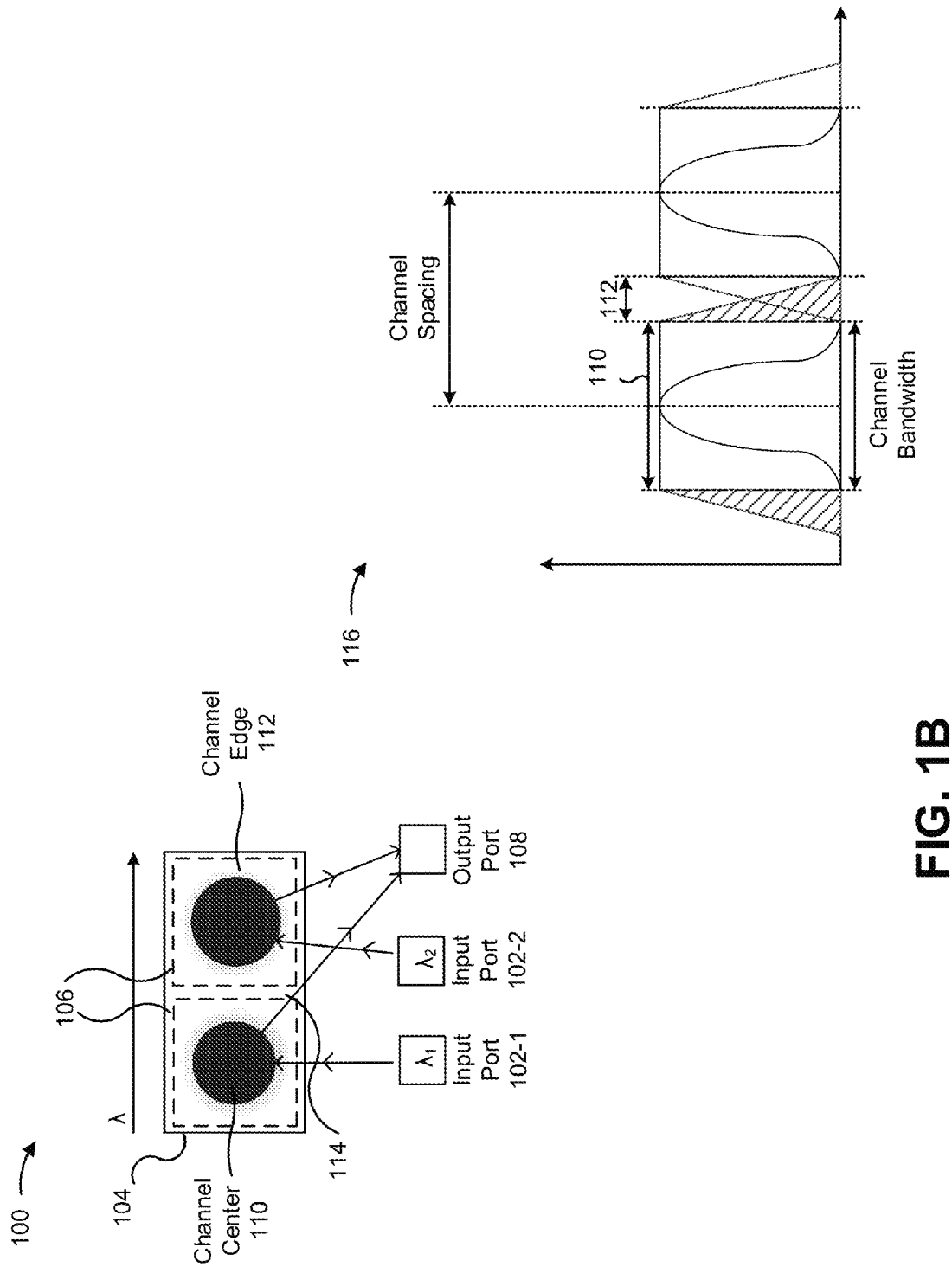

FIGS. 1A-1H are diagrams of an overview of an example implementation 100 described herein. FIGS. 1A and 1B describe a WSS that can perform multicast beam steering using a phased array switching engine. As shown in FIG. 1A, and by reference number 102, an input port 102 of a WSS may receive an optical signal that includes a set of wavelength components (e.g., $\lambda_1$ to $\lambda_X$). In some implementations, input port 102 may be a single, common input port 102 for the WSS. In some implementations, input port 102 may include one or more of a set of input ports of the WSS.

As further shown, the WSS may spatially distribute the optical signal based on wavelengths included in the optical signal. For example, the WSS may include one or more distribution components (e.g., a diffractive grating, a prism, a grism, etc.) that spatially distribute the optical signal into a distributed optical signal based on the wavelengths. The distributed optical signal may include a set of spatially separated wavelength components. As further shown, the wavelength-distributed optical signal may be projected onto a switching engine (not illustrated) including switching array 104. As shown, the wavelengths include $\lambda_1$, shown on a left side of switching array 104, through $\lambda_X$, shown on a right side of switching array 104. Maximizing the use of the spectral bandwidth from $\lambda_1$ to $\lambda_X$ improves spectral efficiency and increases the amount of data that can be transmitted through the WSS. In a WSS using LCoS technology, switching array 104 may include pixels, and a group of pixels may be programmable by applying a grating profile to the pixels to create a single-cast beam steering grating or a multicast beam steering grating (e.g., gratings 106-1 through 106-4).

The distributed optical signal may be projected to switching array 104 such that wavelength of the distributed optical signal increases along a horizontal axis of switching array 104, and columns of pixels, or groups of columns of pixels, may be programmable to impart a tilt to a wavelength component that is incident on the column or group of pixels. A particular optical channel may be incident on a region of pixels, for example, six columns of pixels, ten columns of pixels, or another quantity of columns of pixels. To impart tilt, a region of pixels may be programmed with a periodic blazed grating changing the phase of the incident wavelength component that causes a particular diffraction order of light to be reflected or transmitted at an angle. The tilt imparted to a channel may cause the channel to be directed to a selected output port or a group of output ports if the region of pixels was provided a multi-cast beam steering grating profile (i.e. multiple grating profiles overlap on the same area of a region of pixels).

Gratings 106-1 and 106-2 are shown as being applied to overlapping areas of pixels of the switching array in FIG. 1A, which causes $\lambda_1$ to be directed to output ports 108-1 and 108-2. To overlap multiple gratings 106, an area of pixels may be programmed with two or more superimposed grating profiles. For example, to multiplex four optical channels, four overlapping gratings 106 may be programmed on switching array 104. However, by overlapping four gratings 106, switching array 104 introduces insertion loss proportionate to the quantity of overlapping gratings, similar to the case with a passive combiner, as described in more detail above.

Here, grating 106-2 is shown using a single outline. However, in some implementations, grating 106-2 may include a first grating 106 to steer $\lambda_1$ and a second grating 106 to steer $\lambda_2$. For example, each optical carrier, optical channel, spectral slice, input port 102, or the like, may be associated with a different grating 106 (when being directed to a single output port 108) or multiple gratings 106 (when being directed to multiple output ports 108).

Switching array 104 may be capable of attenuating or reducing an optical intensity of an optical signal. For example, switching array 104 may direct a portion of the transmission power of an optical signal to an output port 108 based on grating 106-3, and may direct a remainder of the transmission power to another port, referred to herein as a "dump port," based on grating 106-4 (e.g., as shown in connection with a black square). Additionally, or alternatively, switching array 104 may be capable of directing (e.g., reflecting or passing) an optical signal at a particular efficiency to attenuate the optical signal to a desired optical intensity.

As shown, $\lambda_1$, $\lambda_2$, and $\lambda_3$ are each directed to output port 108-2 by gratings 106-1 through 106-3 to form a multiplexed optical signal $\lambda_{123}$. Multiplexed optical signal $\lambda_{123}$ may include a super-channel, as described in more detail below, and/or an optical signal including multiple carriers with one or more channel gaps between the multiple carriers. Where multiplexed optical signal $\lambda_{123}$ is a super-channel with reduced guard band, the individual channels $\lambda_1$, $\lambda_2$, and $\lambda_3$ input to the WSS are wavelength tuned prior to the WSS, for example tuned within the transmitter, so that the channel spacing between their center frequencies is equal to their baud rate plus the reduced guard band (which may be zero for Nyquist spaced sub-carriers).

FIG. 1B is a diagram of notation used herein to describe a relationship between input ports, output ports, and beam steering gratings. As shown in FIG. 1B, switching array 104 may receive two optical channels, shown as black dots with gray outlines. The two optical channels are directed to respective regions 106 of the switching array 104. As shown, each optical channel has a channel center 110 and a channel edge 112. Channel center 110 may include the portion of the optical channel used to transmit data via the optical channel. For example, in a 40 gigabit optical channel, channel center 110 may encompass 40 GHz of bandwidth. For clarity, the channel's center frequency would be the frequency at the middle of the channel center 110, and the channel spacing is the separation between centers of two adjacent channels. Channel edge 112 may be created based on spectral shaping due to filtering effects of switching array 104, or the like, and may correspond to guard bands. Channel gaps are illustrated as white space between the gray outlines of successive channels, as shown by reference number 114, but would also include any guard bands between adjacent channels.

Here, input port 102-1 transmits one of the two optical channels to switching array 104, and input port 102-2 transmits the other of the two optical channels to switching array 104. For example, input ports 102-1 and 102-2 may have their optical channels spatially combined and/or transmit the two optical channels to a distribution component that distributes the two optical channels based on wavelength, prior to transmitting the two optical channels to switching array 104. Switching array 104 directs the two optical channels to cause the two optical channels to be outputted to a common output port 108. As shown by reference number 116, the optical intensity of the optical channels may be highest in the channel center 110 (i.e., the channel bandwidth), and the optical intensity decreases at edges of the optical channel corresponding to channel edge 112 (i.e., the guard band).

Figure 1C:
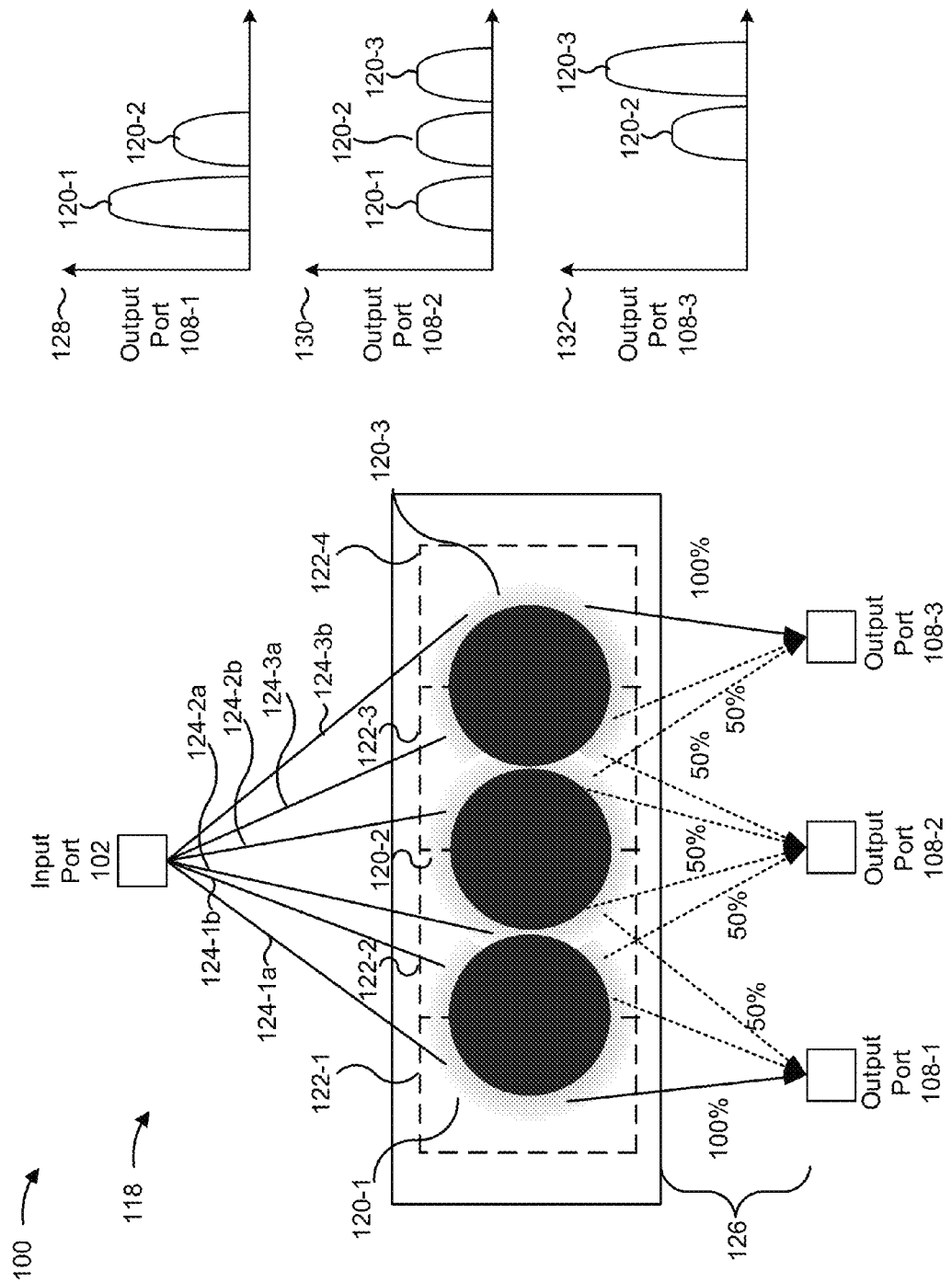

FIG. 1C describes a set of optical channels being demultiplexed, as shown by reference number 118. As shown in FIG. 1C, input port 102 may transmit a super-channel including optical sub-carriers 120-1, 120-2, and 120-3 to switching array 104. As shown, channel edges 112 are shown as overlapping adjacent sub-carriers while channel centers are almost adjacent to each other (i.e., almost no guard band). For example, the three optical sub-carriers may have a reduced guard band or no guard band as compared to the optical sub-carriers shown in FIG. 1B.

Each of sub-carriers 120-1, 120-2, and 120-3 may be associated with a respective region of pixels of the switching array. In FIG. 1C, the region of pixels associated with the left-most sub-carrier 124-1 encompasses areas 122-1 and 122-2. The region of pixels associated with the middle sub-carrier 124-2 encompasses areas 122-2 and 122-3. The region of pixels associated with the right-most sub-carrier 124-3 encompasses areas 122-3 and 122-4. The regions of pixels may be centered on the center frequency of the respective sub-carrier. First areas 122-1 and 122-4 do not overlap other regions of pixels and consequently have a single grating profile applied to them (i.e. the first areas are single-cast beam steering gratings). Second areas 122-2 and 122-3 overlap adjacent regions of pixels and consequently have multiple (two in this example) grating profiles applied to them (i.e. the second areas are multi-cast beam steering gratings). The channel center of each sub-carrier is divided into two parts. Using sub-carrier 124-1 as an example, there is a left part 124-1a incident on first area 122-1 and a right part 124-1b incident on a second area 122-2. The left part 124-2a of the sub-carrier 124-2 is also incident on second area 122-2.

Some parts of the super-channel may be incident on an area of pixels associated with a single optical carrier, such as the left-most portion of sub-carrier 120-1 and the right-most portion of sub-carrier 120-3. Other portions of the super-channel are incident on areas of pixels that are included in overlapping regions of pixels. For example, a left portion of optical sub-carrier 120-2 is incident on an area of pixels also associated with optical sub-carrier 120-1, and a right portion of optical sub-carrier 120-2 is incident on an area of pixels also associated with optical sub-carrier 120-3.

Here, as shown by reference number 124-1, parts of optical sub-carrier 120-1 are incident on beam steering grating 122-1 (e.g., reference number 124-1a) and beam steering grating 122-2 (e.g., reference number 124-1b) based on a region of pixels corresponding to optical sub-carrier 120-1 including gratings 122-1 and 122-2. Similarly, parts of optical sub-carrier 120-2 are incident on beam steering grating 122-2 (e.g., reference number 124-2a) and beam steering grating 122-3 (e.g., reference number 124-2b) based on a region of pixels corresponding to optical sub-carrier 120-2 including gratings 122-2 and 122-3. Similarly, parts of optical sub-carrier 120-3 are incident on beam steering grating 122-3 (e.g., reference number 124-3a) and beam steering grating 122-4 (e.g., reference number 124-3b) based on a region of pixels corresponding to optical sub-carrier 120-3 including gratings 122-3 and 122-4.

As shown by reference number 126, gratings 122 direct the respective parts of the optical sub-carriers 120 to respective output ports 108. For example, optical sub-carrier 120-1 is associated with output port 108-1, optical sub-carrier 120-2 is associated with output port 108-2, and optical sub-carrier 120-3 is associated with output port 108-3.

As shown, when a grating 122 is applied on a first area of pixels (i.e., corresponding to a non-overlapping region of pixels), the corresponding portion of the optical sub-carrier 120 may be directed to output port 108 at substantially full power. For example, as shown by reference number 128, output port 108 receives the left-most portion of optical sub-carrier 120-1 (e.g., the portion corresponding to grating 122-1) at substantially full power. Portions of the optical sub-carriers that are transmitted at substantially full power are denoted by solid lines.

As further shown, when a grating 122 is applied on a second area of pixels (i.e., corresponding to overlapping regions of pixels for two sub-carriers), the corresponding portions of optical sub-carriers 120 may be directed to output port 108 at divided power (e.g., at approximately equal power to each division) because the light incident on the second area is divided into two beams corresponding respectively to each of the two gratings applied to the area of overlapping regions of pixels. Portions of optical sub-carriers 120 that are divided are denoted by dotted lines. For example, multicast beam steering grating 122-2 directs portions of optical sub-carriers 120-1 and 120-2 to output ports 108-1 and 108-2 dividing the power between the two ports (i.e. 50/50 or some other ratio). As another example, grating 122-3 directs and divides portions of optical sub-carriers 120-2 and 120-3 to output ports 108-2 and 108-3. The percentages illustrated in FIG. 1C are intended to show how power is divided by multiple overlapping gratings and not divided by a single grating. The percentages illustrated at 126 are not intended to suggest that the switching array 104 is capable of loss-less optical operation. In some implementations using phased array switching engines, the beams or paths illustrated in FIGS. 1C and 1D, for example, may comprise multiple diffraction orders steered in multiple directions.

As shown by reference number 128, output port 108-1 may receive optical sub-carrier 120-1 at substantially full power, and may receive optical sub-carrier 120-2 at a lower power level based on gratings 122-1 and 122-2. As shown by reference number 130, output port 108-2 may receive optical sub-carriers 120-1, 120-2, and 120-3 at a lower power level based on gratings 122-2 and 122-3. As shown by reference number 132, output port 108-3 may receive optical sub-carrier 120-3 at substantially full power, and may receive optical sub-carrier 120-2 at a lower power level based on gratings 122-3 and 122-4. In some implementations, switching array 104 may apply attenuation to the optical sub-carriers that are received at substantially full power to improve uniformity of the power levels of the optical sub-carriers, as described in more detail below.

The optical sub-carriers may be filtered by respective receiver devices. For example, each receiver device may be configured to receive one of the optical sub-carriers via a respective output port 108, and may filter optical signals not associated with the corresponding optical channel.

In this way, the switching engine de-multiplexes a super-channel that has diminished or zero guard band width between sub-carriers. By using beam steering gratings corresponding to overlapping regions of pixels of the switching engine, the switching engine reduces or eliminates the need for guard bands in between the sub-carriers, thereby increasing data throughput on a given bandwidth.

Figure 1D:
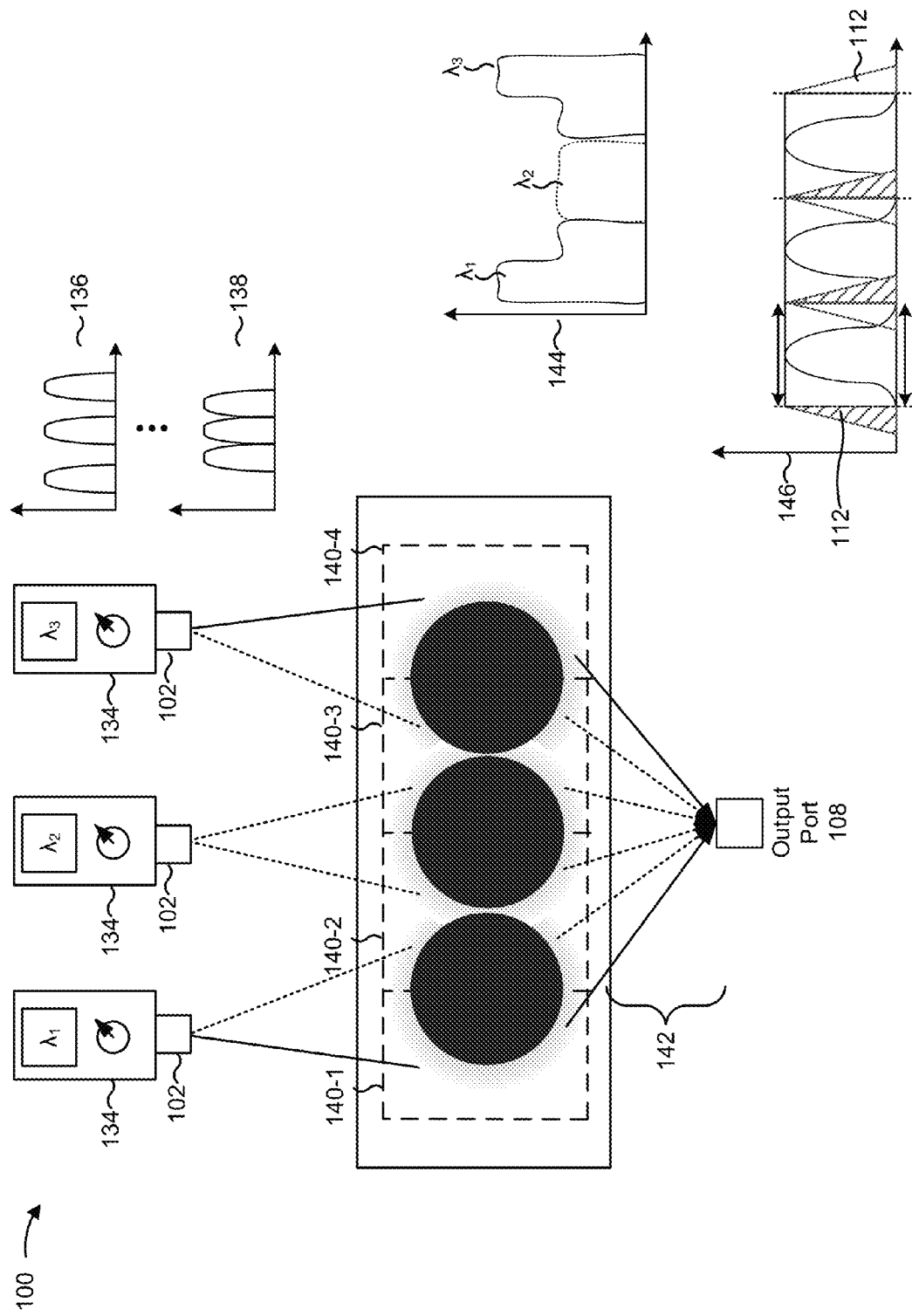

FIG. 1D describes a set of optical sub-carriers being multiplexed using a phased array switching engine. As shown in FIG. 1D, a set of optical channels $\lambda_1$, $\lambda_2$, and $\lambda_3$ may be received from tunable lasers 134, which may include a transmitter/transceiver, a laser emitter, or the like. Tunable lasers 134 may adjust center frequencies of the set of optical channels based on adjacent sub-carriers of a super-channel. For example, as shown by reference number 136, the optical channels may initially be separated by guard bands or may be in completely different areas of the frequency spectrum. Tunable lasers 134 may tune individual optical channels to set the center frequencies of the adjacent sub-carriers of the super-channel in such a way that they are spaced with reduced or zero guard band (e.g., Nyquist spaced) as shown by reference number 138. In some implementations, tunable lasers 134 may adjust the center frequencies based on an instruction from a ROADM that includes switching array 104, or the like.

The sub-carriers may be spatially distributed based on wavelength, and may be directed to a switching array. Each sub-carrier may be associated with a respective region of pixels of the switching array. Each region of pixels encompass the channel center 110 of the respective sub-carrier on the switching array. A grating profile is applied to each region to direct light from that sub-carrier to the output port. First areas 140-1 and 140-4 do not having overlapping regions of pixels and consequently have a single grating profile applied to them (i.e. the first areas are single-cast beam steering gratings). Second areas 140-2 and 140-3 have overlapping regions of pixels and consequently have multiple (two in this example) grating profiles applied to them (i.e. the second areas are multi-cast beam steering gratings).

Gratings 140-1 and 140-4 are applied to first areas of pixels corresponding to $\lambda_1$ and $\lambda_3$, and are single beam steering gratings. As shown by reference number 142, gratings 140-1 and 140-4 steer parts of $\lambda_1$ and $\lambda_3$ to output port 108.

Gratings 140-2 and 140-3 are applied to a second area corresponding to regions of pixels associated with $\lambda_1$ and $\lambda_2$, and to a second area corresponding to regions of pixels associated with $\lambda_2$ and $\lambda_3$, respectively. Gratings 140-2 and 140-3 are multiple beam steering gratings. For example, as shown by reference number 142, grating 140-2 may steer parts of $\lambda_1$ and $\lambda_2$ to output port 108, and grating 140-3 may steer portions of $\lambda_2$ and $\lambda_3$ to output port 108.

As shown by reference number 144, output port 108 may receive some parts of $\lambda_1$ and $\lambda_3$ at a higher intensity level than other parts of $\lambda_1$ and $\lambda_3$ and/or $\lambda_2$ based, for example, on some parts of $\lambda_1$ and $\lambda_3$ each being associated with a single beam steering grating and other parts of $\lambda_1$, $\lambda_2$, and $\lambda_3$ being associated with only multi-cast beam steering gratings. Reference number 146 shows overlapping and non-overlapping guard bands 112 of the super-channel. As shown, the super-channel does not include guard bands 112 between adjacent channels (i.e., the guard bands that would be between adjacent channels fully overlap the neighboring channels), which reduces bandwidth required to transmit the super-channel.

In this way, the WSS generates a super-channel with zero guard band based on input optical carriers, which may or may not be received with zero guard band. Furthermore, the WSS generates the super-channel based on optical carriers received via multiple input ports 102, which may not be possible using a WSS that is not capable of multi-cast beam steering, or the like.

Figure 1E:
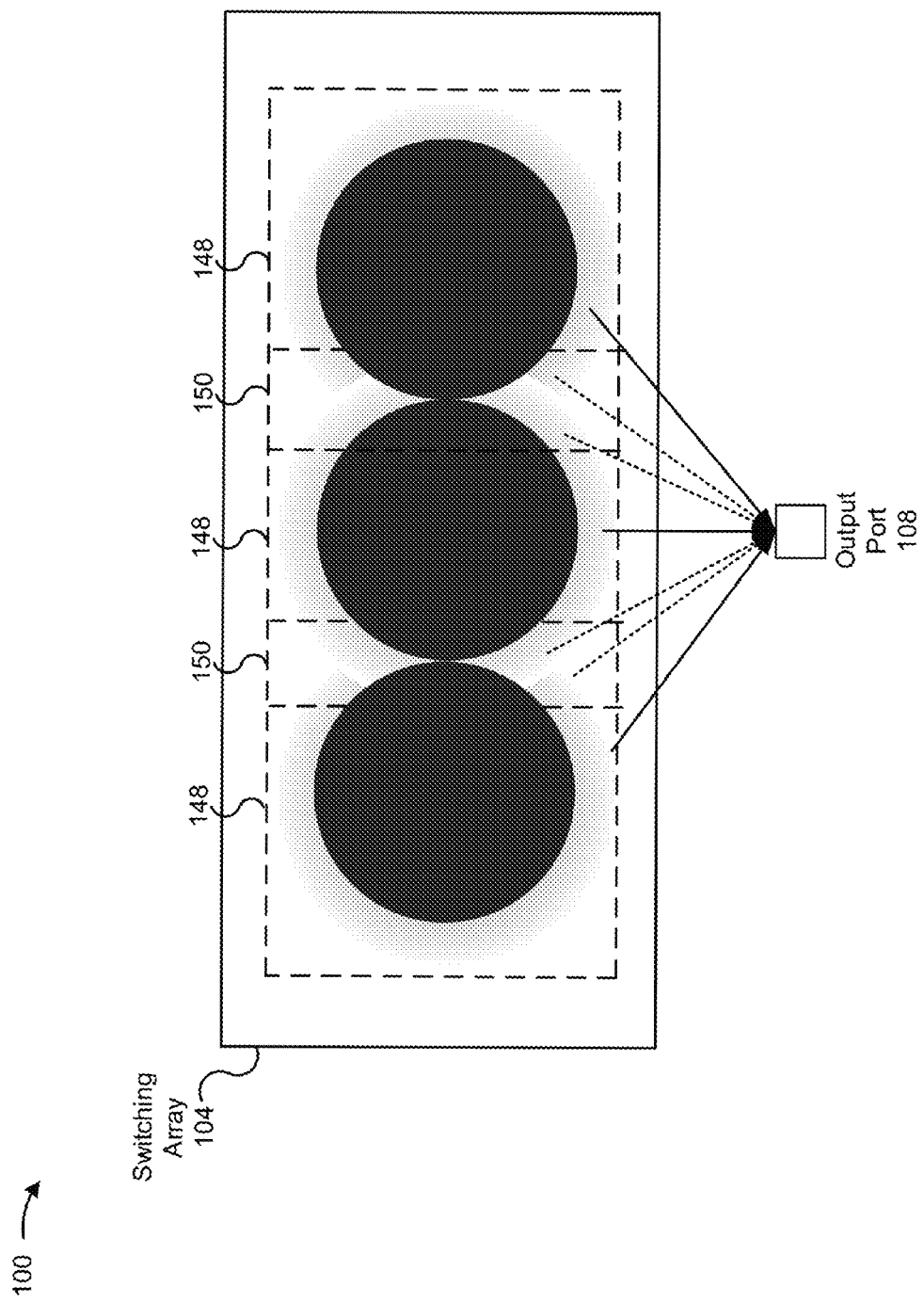

FIG. 1E is a diagram of an example implementation showing narrower second areas than the example implementation shown in FIG. 1D. As shown in FIG. 1E, single-cast beam steering gratings 148 may be implemented for first areas of switching array 104 associated with portions of the distributed optical signal in which channel edges (i.e., guard bands) do not overlap, and multiple beam steering gratings 150 may be implemented for second areas of switching array 104 associated with portions of the optical signal in which the channel edges (i.e., guard bands of adjacent optical channels) overlap. As shown, the first parts are single-casted to output port 108, and the second parts are multi-casted to output port 108.

Figure 1F:
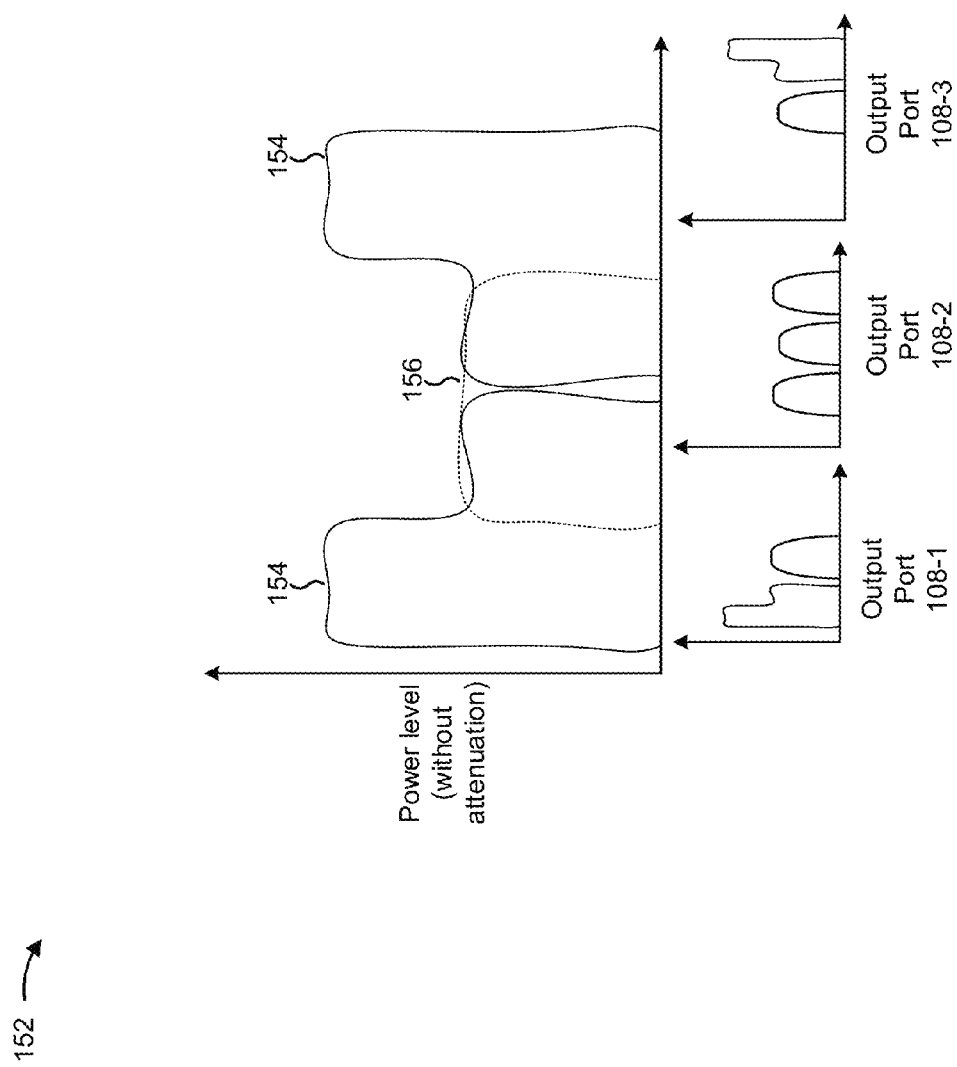

FIG. 1F is a diagram of an example graph 152 showing insertion loss corresponding to a set of three optical channels that were de-multiplexed using partially overlapping beam steering gratings, as described in more detail in connection with FIG. 1C, above. As shown by reference number 154, some parts of the de-multiplexed optical signal may be associated with a higher power level (i.e., less insertion loss) than other portions of the optical signal. Here, the parts shown by reference number 154 are associated with single beam steering gratings 122-1 and 122-4 in FIG. 1C. As shown by reference number 156, parts of the optical signal that are associated with multiple beam steering gratings may be associated with more insertion loss than the parts shown by reference number 154. Here, the parts shown by reference number 150 are associated with beam steering gratings 122-2 and 122-3 in FIG. 1C, and incur higher insertion loss based on the multiple beam steering gratings. The same effect can be observed when three optical channels are multiplexed into three sub-carriers of a super-channel. The sub-carriers at the edge of the super-channel will have higher power (experience less insertion loss) because of the first areas having single beam steering gratings.

Figure 1G:
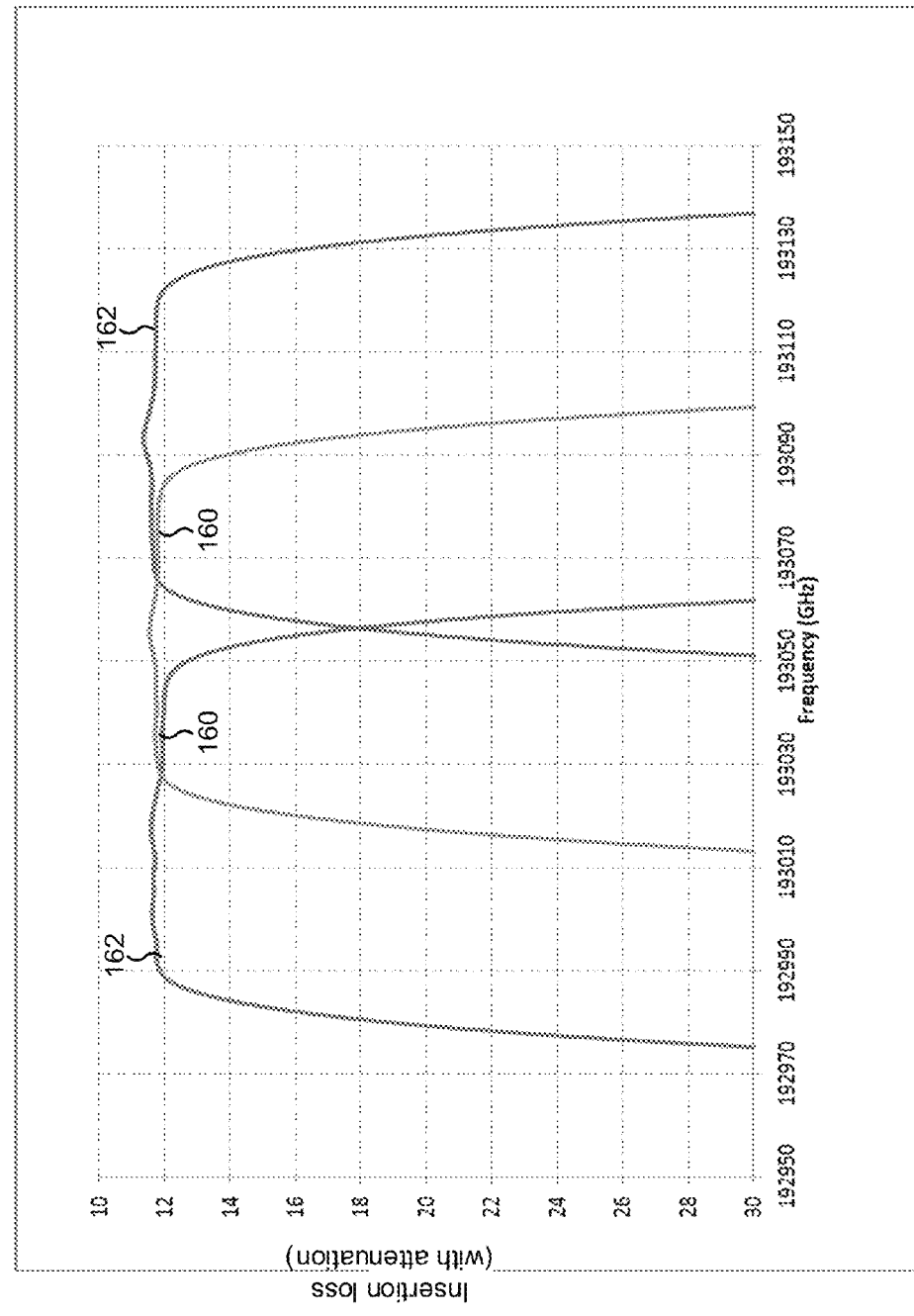

FIG. 1G is a diagram of an example graph 158 showing an effect of attenuating beam steering gratings to improve uniformity of insertion loss across all channels. Graph 158 may correspond to the de-multiplexed optical signal shown in FIG. 1C. As shown, the insertion loss at reference number 160 (e.g., corresponding to multiple beam steering gratings 122-2 and 122-3) is substantially equal to the insertion loss at reference number 162 (e.g., corresponding to single beam steering gratings 122-1 and 122-4). To counteract the insertion loss caused by gratings 122-2 and 122-3, gratings 122-1 and 122-4 may attenuate the corresponding parts of the optical signal by an appropriate amount to decrease power of the corresponding parts. For example, gratings 122-1 and 122-4 may attenuate the first portions by approximately 3 dB or in a range of approximately 2 dB to 12 dB. In this way, insertion loss in the portions of the super-channel corresponding to multiple beam steering gratings, shown by reference number 160, is made to be similar to insertion loss in portions of the optical channel corresponding to single beam steering gratings, shown by reference number 162. This may reduce amplitude variations across all wavelengths in the super-channel, simplify decoding, transmission, and amplification of the super-channel, and may increase reach of the super-channel.

By using partially overlapping beam steering gratings to multiplex and/or de-multiplex optical signals, the switching engine reduces insertion loss and decreases the guard band needed to multiplex and/or de-multiplex the optical signals. For example, if the switching engine uses non-overlapping beam steering gratings, the switching engine may introduce channel shaping effects, thereby necessitating guard bands. As another example, if the switching engine uses fully-overlapping beam steering gratings, analogous to a passive combiner or a passive splitter, the switching engine may cause greater insertion loss than implementations described herein.

Figure 1H:
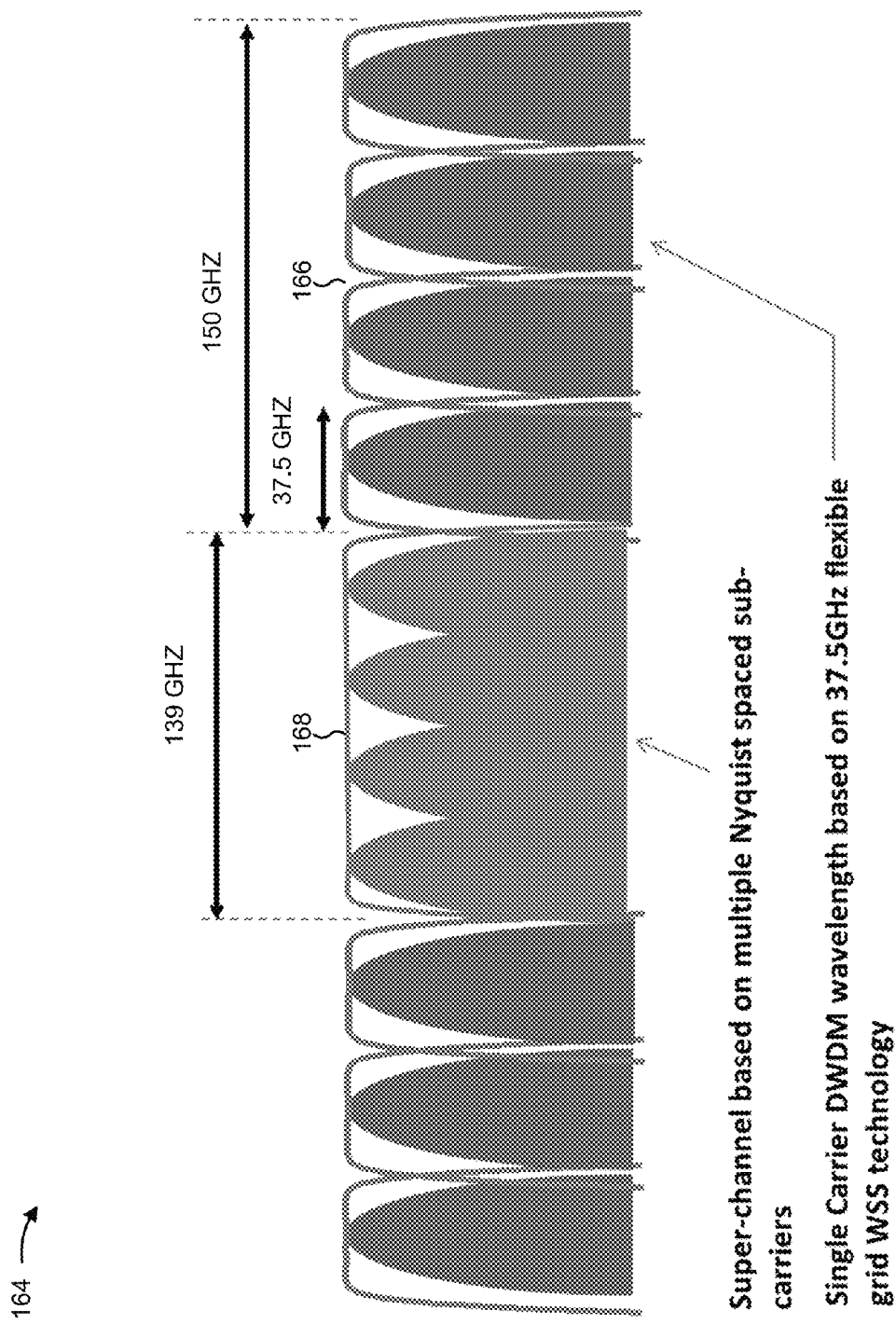

FIG. 1H is an example illustration 164 of bandwidths of a set of optical channels. As shown by reference number 166, a DWDM signal may include optical channels that are each associated with 37.5 GHz of bandwidth. For the sake of this example, assume that the bandwidth includes 32 GHz of bandwidth for the optical channel data and 5.5 GHz of guard band to reduce crosstalk. As shown, in such a case, four such optical channels use 150 GHz of bandwidth (i.e., 37.5 GHz*4).

As shown by reference number 168, a super-channel using four Nyquist spaced sub-carriers may use less bandwidth than of the four optical channels 166 previously described. For example, here, the super-channel uses 139 GHz of bandwidth. Continuing the assumption from the above example, it can be seen that 128 GHz of the 139 GHz of bandwidth are used for optical channel data, as compared to 128 GHz of the 150 GHz of the DWDM signal being used for optical channel data. The remaining 11 GHz of super-channel bandwidth may be used to reduce crosstalk, for example, to include guard bands between the super-channel and spectrally adjacent channels and/or for reduced guard bands between sub-carriers in the super-channel.

In this way, implementations described herein enable multiplexing and de-multiplexing of sub-carriers having zero (or near zero or otherwise reduced) guard band in super-channels while reducing insertion loss as compared to a passive combiner or a set of fully overlapping beam steering gratings.

As indicated above, FIGS. 1A-1H are included merely as examples. Other examples are possible, and may differ from what was described with regard to FIGS. 1A-1H.

Figure 2A:
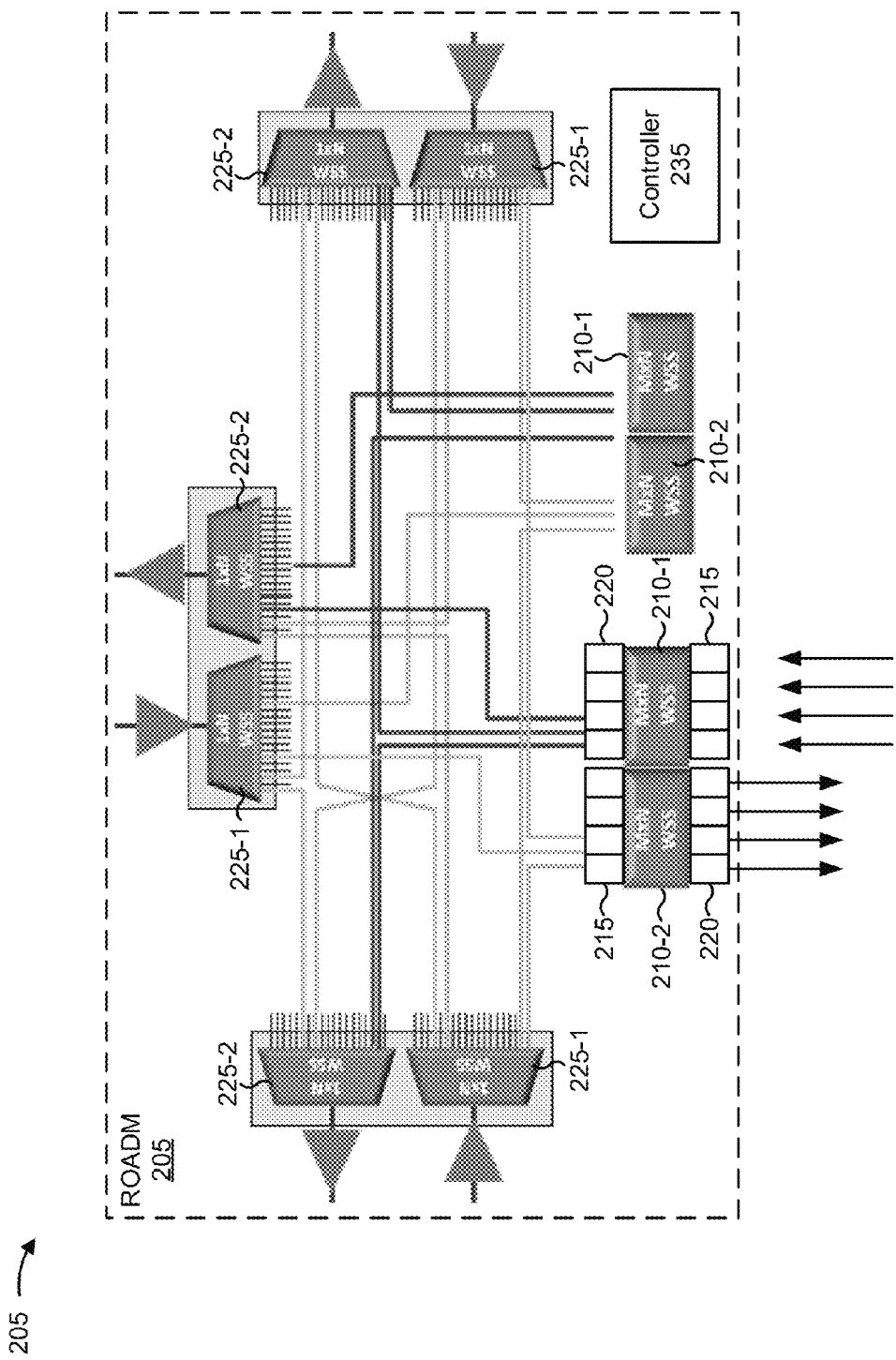
FIG. 2A is a diagram of an example implementation of a reconfigurable optical add-drop multiplexer.

FIG. 2A is a diagram of an example ROADM 205 that may include implementations described herein. A ROADM 205 is but one example of an optical device that may include implementations described herein. As shown, ROADM 205 includes one or more M×N WSS 210, one or more 1×N WSS 225, and a controller 230. As shown, the M×N WSS 210-1 and 210-2 are associated with input ports 215 and output ports 220; however, any of the 1×N WSS 225 may be associated with input ports 215 and output ports 220 or may have the same structure as described in respect of FIG. 1A or 2B. ROADM 205 may receive incoming optical channels already in the optical network through the 1×N WSSes 225-1 and route them in different directions through 1×N WSSes 225-2. ROADM 205 may add optical channels to the optical network through M×N WSS 210-1, and/or may drop optical channels from the optical network (i.e. to a local network, to a data center, or to another optical network component) through M×N WSS 210-2. Redundant add/drop M×N WSSes 210-2 and 210-1 may be provided, as illustrated, to be provisioned in case of failure of the primary add/drop M×N WSSes 210-2 and 210-1. Alternatively or additionally, the second bank of add/drop M×N WSSes 210-2 and 210-1 may be provisioned to allow more optical channels to be added or dropped at this ROADM 205.

ROADM 205 may multiplex, de-multiplex, add, drop, and/or route multiple optical channels into and/or out of the optical network. In some cases, M×N WSS 210-2 of ROADM 205 may drop an optical signal, and may allow one or more other optical signals to continue propagating toward a receiver/transceiver device. The dropped optical signal may be provided to a device (not shown) that may demodulate and/or otherwise process the dropped optical signal to output the data stream carried by the dropped optical signal.

In some cases, M×N WSS 210-1 of ROADM 205 may add an optical signal to the optical network. The added optical signal and the other optical signals, other than the dropped optical signal, may propagate to other ROADMs 205 in the optical network.). M×N WSS 210-1 may be referred to herein as an add M×N WSS 210, and M×N WSS 210-2 may be referred to herein as a drop M×N WSS 210.

M×N WSS 210 may be associated with a set of input ports 215 and a set of output ports 220. An optical signal can be provided from any one or more of the set of input ports 215 to any one or more of the set of output ports 220 by M×N WSS 210. For example, M×N WSS 210 may include a phased array switching engine (e.g., an LCoS switching engine), as described in more detail in connection with FIGS. 1A, 1B, and 2C. In some implementations, phased array switching engines may be programmable. In some implementations, M×N WSS 210 may provide a combined optical signal from multiple input ports 215 to one or more output ports 220. In some implementations, M×N WSS 210 may de-multiplex an optical signal from a single input port 215, and may provide sub-signals to one or more output ports 220. In some implementations, M×N WSS 210 may provide an optical signal from a single input port 215 to a single output port 220.

1×N WSS 225-1 may receive optical signals inbound to ROADM 205 (i.e. from within the optical network), and may switch the optical signals to one or more M×N WSS 210 (e.g., to be dropped or routed to 1×N WSS 225-2) and/or 1×N WSS 225-2. That is, 1×N WSS 225-1 may receive inbound optical signals from other optical nodes of the optical network, and 1×N WSS 225-2 may provide outbound optical signals to other optical nodes of the optical network.

As shown, ROADM 205 may include controller 230. Controller 230 may include a device capable of performing operations related to configuring and operating ROADM 205. For example, controller 230 includes a processor in the form of, for example, a central processing unit, a microprocessor, a digital signal processor, a microcontroller, a field-programmable gate array, an integrated circuit (e.g., an application-specific integrated circuit), or another form of processor. Controller 230 is implemented in hardware, firmware, or a combination of hardware and software. In some implementations, controller 230 may include one or more processors capable of being programmed to perform a function. Controller 230 may also include a memory, such as a random access memory (RAM), a read only memory (ROM), and/or another type of dynamic or static storage device (e.g., a flash memory, a magnetic memory, an optical memory, etc.) that stores information and/or instructions for use by controller 230.

The memory of controller 230 may include data defining different beam steering grating profiles to be applied to different regions of pixels of switching array 240. Controller 230 may include instructions, hardware or firmware, or the like for applying the beam steering grating profiles to switching array 240, overlapping grating profiles on regions of pixels, or updating the grating profiles.

In some implementations, ROADM 205 may include an optical channel monitor (not shown). An optical channel monitor includes a monitoring component capable of monitoring performance of an optical signal. For example, an optical channel monitor includes a device that determines a channel power measurement or a series of power measurements associated with one or more wavelengths for an optical fiber and/or an optical signal.

Controller 230 may configure M×N WSS 210 or another component of ROADM 205 (e.g., 1×N WSS 225, etc.) to add, drop, or route optical signals. For example, controller 230 may cause M×N WSS 210 to implement one or more single-cast or multicast beam steering gratings.

FIG. 2B is a diagram of example components of M×N WSS 210 that includes a phased array switching engine. As shown, M×N WSS 210 includes one or more input ports 215-1 through 215-M, one or more output ports 220-1 through 220-N, a dispersion component 235, and a switching array 240. Other optical, electrical, mechanical and environmental components may also be included within the M×N WSS 210, for example, lenses, a spherical mirror, a thermistor, a hermetic housing, moisture getter, particular mixtures of gases and electrical and optical feedthroughs.

Dispersion component 235 may include, for example, a diffractive grating, a prism, a grism, or the like. Dispersion component 235 receives one or more input optical signals from input port 215. Dispersion component 235 disperses the one or more input optical signals into a distributed optical signal, comprised of spatially separated wavelength components, in a wavelength direction. For example, dispersion component 235 may impart a particular angular separation to the wavelength components to cause the wavelength components to be spatially distributed along the wavelength direction.

Switching array 240 includes independently controllable elements (e.g., pixels, etc.) that are spatially separated in the wavelength direction. Each switching array element may receive some of a different wavelength component, of the spatially separated wavelength components, and may steer the corresponding wavelength component in a switching direction. For example, the wavelength direction may be orthogonal to the switching direction. Switching array 240 may cause the wavelength components to be directed (e.g., reflected, passed, etc.) back to dispersion component 235 (or to another dispersion component) at different angles in the switching direction. For example, a first wavelength component may be directed at an upward angle to cause the first wavelength component to couple with a first output port 220, and a second wavelength component may be directed at a downward angle to cause the second wavelength component to couple with a second output port 220.

After receiving the wavelength components from switching array 240, dispersion component 235 may combine the wavelength components in the wavelength direction. For example, if dispersion component 235 imparted an angular divergence to disperse the wavelength components, dispersion component 235 may impart an angular convergence to cause the wavelength components to return to an original dispersion state in the wavelength direction. Dispersion component 235 may direct the wavelength components to output ports 220.

After the wavelength components are combined in the wavelength direction, the wavelength components retain the deflections in the switching direction imparted by switching array 240. Thus, the wavelength components reach output ports 220 separated only in the switching direction and couple into different output ports 220 based on how each wavelength component was steered by the corresponding element of switching array 240. The above M×N WSS description is equally applicable to a 1×N WSS (i.e. M=1). Internal configurations of WSSes other than those described above are equally applicable.

The number and arrangement of devices and networks shown in FIGS. 2A and 2B are provided as an example. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices shown in FIGS. 2A and 2B may perform one or more functions described as being performed by another set of devices shown in FIGS. 2A and 2B.

FIG. 3 is a flow chart of an example process 300 for de-multiplexing a super-channel using partially overlapping regions of pixels having beam steering gratings applied to the switching array of a WSS. In some implementations, one or more process blocks of FIG. 3 may be performed by at least one of M×N WSS 210 or 1×N WSS 225. In some implementations, one or more process blocks of FIG. 3 may be performed by another device, such as ROADM 205 or controller 230.

As shown in FIG. 3, process 300 may include receiving an optical signal carrying a super-channel that includes multiple sub-carriers to be directed to respective output ports (block 310). For example, M×N WSS 210 may receive an optical signal carrying a super-channel. The super-channel may include multiple sub-carriers that are to be directed to respective output ports 220.

In some implementations, at least two of the sub-carriers may be associated with different output ports 220. For example, each optical channel may be associated with a respective output port 220. Additionally, or alternatively, two or more of the optical channels may be associated with the same output port 220. M×N WSS 210 may direct the sub-carriers to the corresponding output port 220 or output ports 220 en route to other ROADMs 205 or other optical devices that are to receive the sub-carriers.

As further shown in FIG. 3, process 300 may include directing the optical signal to a switching array having regions of pixels, with partial overlap, corresponding to respective sub-carriers of the multiple sub-carriers (block 320). For example, dispersion component 235 of M×N WSS 210 may spatially distribute the optical signal based on wavelength to create a distributed optical signal. The distributed optical signal may be directed to switching array 240 of M×N WSS 210 (e.g., by dispersion component 235, by optics included in M×N WSS 210, etc.). Each sub-carrier may be incident on a corresponding region of pixels of switching array 240, and the regions of pixels may partially overlap.

The super-channel may include reduced guard band or no guard band between sub-carriers as compared to a DWDM signal, and the degree of overlap of the regions of pixels may be determined based on sizes of the inter-sub-carrier guard bands of the super-channel. For example, when the super-channel has Nyquist channel spacing (i.e., no guard band between the sub-carriers), the regions of pixels may have 50% overlap, indicating that 50% of a width of a first region of pixels is shared by a second region of pixels that overlaps the first region of pixels. As the guard bands of the super-channel increase in size, the degree of overlap of the overlapping regions of pixels may decrease.

As further shown in FIG. 3, process 300 may include applying beam steering gratings, to the regions of pixels, to direct parts of the sub-carriers to the respective output ports, the regions having first areas associated with single beam steering gratings, and second areas associated with multiple beam steering gratings, the second areas corresponding to the partial overlap of the regions of pixels (block 330). For example, switching array 240 may apply beam steering gratings to the regions of pixels corresponding to the sub-carriers. Switching array 240 may apply single beam steering gratings to first areas of the regions based on the first areas being associated with a single region of pixels (i.e., based on the first areas having a single optical sub-carrier incident on the first areas).

Switching array 240 may apply multiple beam steering gratings to each second area of pixels. A second area is defined based on an overlap between two regions of pixels corresponding to two sub-channels. Based on a second area including overlapping regions corresponding to two sub-channels, switching array 240 may apply multiple beam steering gratings. For example, switching array 240 may apply a first beam steering grating to steer a first sub-carrier to a corresponding output port 220, and may apply a second beam steering grating to steer a second sub-carrier to another output port 220 corresponding to the second sub-carrier.

In a case where the overlapping regions overlap by less than 50 percent (e.g., 10 percent, 30 percent, 40 percent, etc.) of a spectral range of the regions, each of the optical sub-carriers may be associated with a respective first area. In such a case, M×N WSS 210 may implement a respective single beam steering grating for each of the optical sub-carriers to direct the optical sub-carriers to output ports 220 corresponding to the optical sub-carriers.

In a case where the regions of pixels overlap by approximately 50 percent of the spectral ranges of the regions of pixels, not all of the optical sub-carriers may be associated with a first area (i.e., or a single beam steering grating). For example, when de-multiplexing a 3 sub-carrier super-channel with Nyquist channel spacing, the regions for each sub-carrier may overlap such that first and third sub-carrier regions are abutting one another, and such that half the second sub-carrier region overlaps half of the first sub-carrier region, and the other half of the second sub-carrier region overlaps half of the second sub-carrier region.

Thus, moving from the first sub-carrier region to the third sub-carrier region, there are four areas of pixels with different combinations of grating profiles. The first area has the first sub-carrier's grating profile applied and it receives half of the light from the first sub-carrier's channel center. The second area has the first and second sub-carriers' grating profiles applied and the second area receives half of the light from the first and second sub-carrier's channel centers. The second area multi-casts the first and the second sub-carriers based on the multiple gratings applied to it from the overlapping regions.

The third area has the second and third sub-carrier's grating profiles applied and the third area receives half of the light from the second and third sub-carriers' channel centers. The third area accordingly multi-casts both sub-carriers as well. The fourth area has the third sub-carrier's grating profile applied, and the fourth area receives half of the light from the third sub-carrier's channel center. The fourth area single-casts the light from the third sub-carrier's channel center. A pattern is apparent whereby, when the super-channel has Nyquist spacing, the outermost areas of the regions of pixels applied to all sub-carriers are single-cast, while the areas therebetween are multi-cast with a combination of the grating profiles for the two adjacent sub-carriers.

In some implementations, M×N WSS 210 may direct parts of the optical signal to respective output ports 220 at an attenuated intensity level. For example, light that is multi-casted by multiple beam steering gratings may be associated with greater insertion loss than light that is directed by single beam steering gratings in first areas (i.e., non-overlapping areas). To normalize insertion loss or equalize power levels of channels and sub-channels, switching array 240 may cause the single beam steering gratings to attenuate the light that is directed by the single beam steering gratings, thereby causing insertion loss to be approximately uniform across the sub-carriers.

In some implementations, M×N WSS 210 may use a measurement by an optical channel monitor to determine an attenuation value based on which to attenuate one or more of the first areas. For example, M×N WSS 210 may use the optical channel monitor to determine a power measurement or an insertion loss value in a portion of the spectral band associated with multiple beam steering gratings, and may use that value to determine an attenuation value to use in a portion of the spectral band associated with a single beam steering grating. In this way, M×N WSS 210 improves uniformity of insertion loss for a de-multiplexed optical signal, thereby reducing OSNR and simplifying processing and/or decoding of the de-multiplexed optical signal.

As further shown in FIG. 3, process 300 may include directing, from the first areas, respective parts of the optical signal incident on the first areas to respective output ports (block 340). For example, switching array 240 may direct parts of the optical signal that are incident on the first areas to respective output ports 220 associated with the parts of the optical signal. In some implementations, each part of the optical signal that is incident on a first area may be associated with a corresponding optical sub-carrier, and may be directed to an output port 220 corresponding to the optical sub-carrier by a single beam steering grating. In some implementations, the parts of the optical signal incident on the first areas may be attenuated when directed to the respective output ports 220, as described in more detail elsewhere herein. In some implementations, a first part of the optical signal may be directed to output port 220, and a second part of the optical signal may be directed elsewhere (e.g., to a dump port, to an area of M×N WSS 210 not associated with an output port, etc.) based on higher-order diffractive action. For simplicity, higher diffraction orders have not been illustrated in the figures.

As further shown in FIG. 3, process 300 may include directing, by each of the multiple beam steering gratings of a second area, parts of the optical signal incident on the second area, to respective output ports corresponding to each of the multiple beam steering gratings (block 350). For example, each second area of switching array 240 (i.e., each area defined by overlapping regions of pixels) may be associated with multiple beam steering gratings. Each beam steering grating, of the multiple beam steering gratings, may correspond to a different output port 220, which may be associated with a corresponding optical sub-carrier and region of pixels. Parts of the optical signal that are incident on a second area may be directed to output ports 220 corresponding to the multiple beam steering gratings applied to the second area. In this way, parts of the optical signal incident on overlapping regions of pixels are directed to appropriate output ports 220, thereby facilitating de-multiplexing of optical signals with no guard band or diminished guard band.

In this way, M×N WSS 210 facilitates de-multiplexing of a super-channel that is associated with a diminished guard band width or zero guard band width using a phased array switching engine or other switching engine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
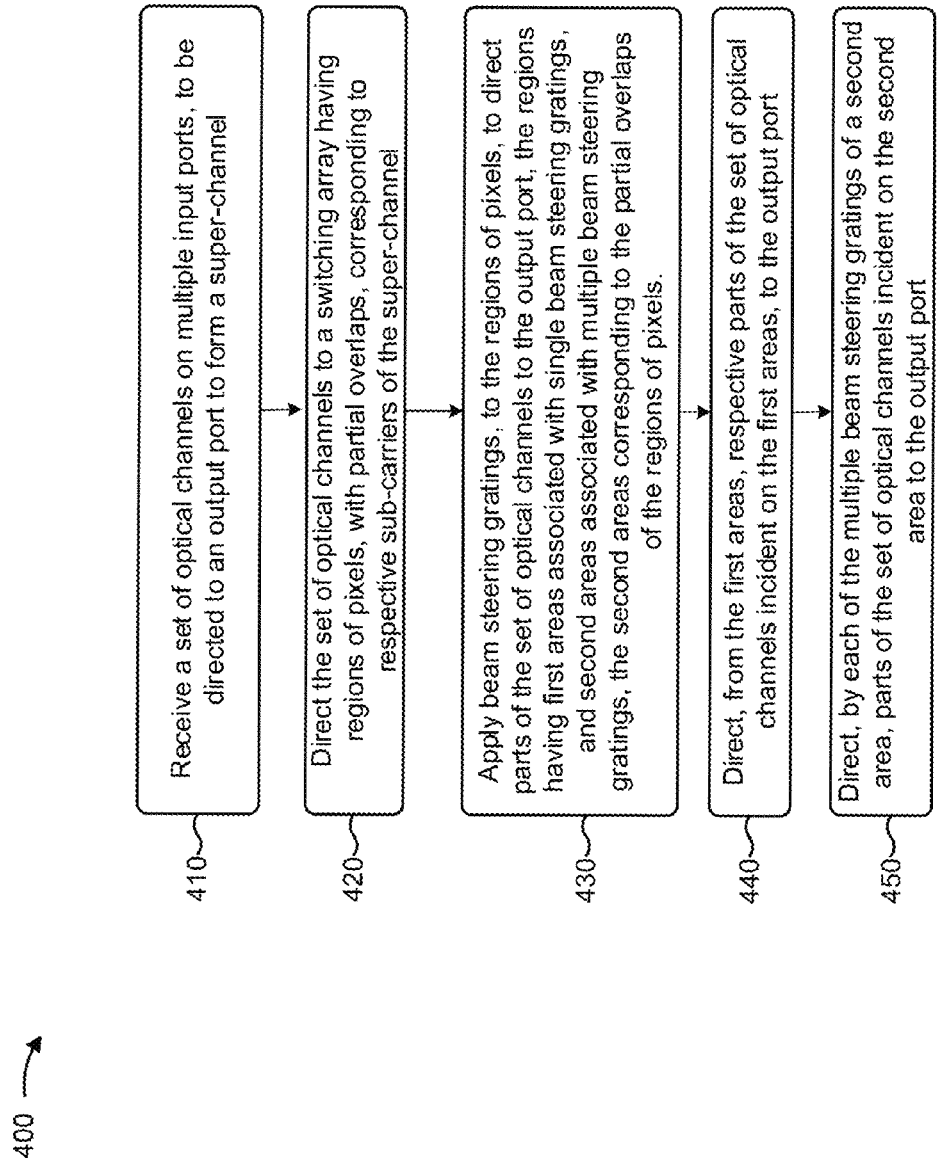
FIG. 4 is a flow chart of an example process for generating a super-channel using a phased array switching engine.

FIG. 4 is a flow chart of an example process 400 for generating a super-channel using a phased array switching engine. In some implementations, one or more process blocks of FIG. 4 may be performed by at least one of M×N WSS 210 or 1×N WSS 225. In some implementations, one or more process blocks of FIG. 4 may be performed by another device, such as ROADM 205 or controller 230.

As shown in FIG. 4, process 400 may include receiving a set of optical channels on multiple input ports to be directed to an output port to form a super-channel (block 410). For example, M×N WSS 210 may receive, via one or more input ports 215, a set of optical channels. M×N WSS 210 may receive the set of optical channels via multiple input ports 215 from one or more transmitter/transceiver devices, from one or more ROADMs 205, or the like. M×N WSS 210 may receive the set of optical channels to combine the set of optical channels to form a super-channel.

In some implementations, a set of tunable lasers may adjust center frequencies of the set of optical channels to reduce or eliminate the guard band between adjacent optical channels. For example, if a pair of optical channels is initially separated by a guard band of 10 GHz, a pair of corresponding tunable lasers may reduce a channel spacing of the pair of optical channels by 10 GHz. In some implementations, the tunable lasers may be external to ROADM 205, and may adjust the center frequencies of the set of optical channels based on an instruction received from ROADM 205.

As further shown in FIG. 4, process 400 may include directing the set of optical channels to a switching array having regions of pixels, with partial overlaps, corresponding to respective sub-carriers of the super-channel (block 420). For example, dispersion component 235 may spatially distribute the set of optical channels, based on wavelength, to create a distributed optical signal. The distributed optical signal may be directed to switching array 240 of M×N WSS 210 (e.g., by dispersion component 235, by optics included in M×N WSS 210, etc.). Each sub-carrier may be incident on a corresponding region of pixels of switching array 240, and the regions of pixels may partially overlap.

As further shown in FIG. 4, process 400 may include applying beam steering gratings, to the regions of pixels, to direct parts of the set of optical channels to the output port, the regions having first areas associated with single beam steering gratings, and second areas associated with multiple beam steering gratings, the second areas corresponding to the partial overlaps of the regions of pixels (block 430). For example, switching array 240 may apply beam steering gratings to the regions of pixels corresponding to the set of optical channels. Switching array 240 may apply single beam steering gratings to first areas of the regions based on the first areas being associated with a single region of pixels (i.e., based on the first areas having a single optical channel incident on the first areas).

Switching array 240 may apply multiple beam steering gratings to each second area of switching array 140. A second area is defined by an overlap between two regions of pixels corresponding to two optical channels. Based on a second area including overlapping regions corresponding to two optical channels, switching array 240 may apply multiple beam steering gratings. For example, switching array 240 may apply a first beam steering grating to steer a first optical channel to output port 220, and may apply a second beam steering grating to steer a second optical channel to output port 220.

As further shown in FIG. 4, process 400 may include directing, from the first areas, respective parts of the set of optical channels incident on the first areas, to the output port (block 440). For example, switching array 240 may direct parts of the set of optical channels that are incident on the first areas to output port 220. In some implementations, each part of the set of optical channels that is incident on a first area may be associated with a corresponding optical channel, and may be directed to output port 220 by a single beam steering grating. In some implementations, the parts of the set of optical channels incident on the first areas may be attenuated when directed to output port 220, as described in more detail elsewhere herein. In some implementations, a first part of the set of optical channels may be directed to output port 220, and a second part of the set of optical channels may be directed elsewhere (e.g., to a dump port, to an area of M×N WSS 210 not associated with an output port, etc.) based on higher-order diffractive action.

As further shown in FIG. 4, process 400 may include directing, by each of the multiple beam steering gratings of a second area, parts of the set of optical channels incident on the second area to the output port (block 450). For example, each second area of switching array 240 (i.e., each area defined by overlapping regions of pixels corresponding to different optical channels) may be associated with multiple beam steering gratings. Each beam steering grating, of the multiple beam steering gratings, may correspond to a different optical channel, of the set of optical channels, and a corresponding region of pixels. Parts of the optical signal that are incident on a second area may be directed to output port 220 based on the multiple beam steering gratings applied to the second area. In this way, parts of the optical signal incident on overlapping regions of pixels are directed to the output port 220, thereby facilitating multiplexing of optical signals with no guard band or diminished guard band using a phased array switching engine or other switching engine.

By transmitting the super-channel with diminished or zero guard band width, M×N WSS 210 increases bandwidth of the optical network. Furthermore, by attenuating portions of the optical signal that are incident on single beam steering gratings, M×N WSS 210 reduces likelihood that an optical channel will experience performance degradation due to in-band variations in amplitude. Still further, by using partially overlapping beam steering gratings, rather than a set of beam steering gratings that each encompasses an entirety of the distributed optical signal, M×N WSS 210 reduces insertion loss associated with combining the optical channels. The example described above in respect of FIG. 4 is equally applicable to a 1×N WSS (i.e. M=1).

Implementations described herein may be implemented in firmware of an optical device (e.g., an optical node, a ROADM, an M×N WSS, a 1×N WSS, etc.), and are capable of being remotely installed in existing (e.g., field-installed, already manufactured, etc.) optical devices (e.g., optical nodes, ROADMs, M×N WSS, 1×N WSS, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

While implementations described herein are described with regard to a LCoS phased array switching engine, implementations described herein are not intended to be limited to the LCoS phased array switching engine. Indeed, implementations described herein may be performed using any switching engine capable of switching optical signals using phased arrays. Furthermore, implementations described herein may be performed using switching arrays that are not phased arrays provided that the elements (or pixels) of the switching array provide sufficient granularity to independently control the regions of pixels and first and second areas which receive portions of channels. For example, a MEMs based switching array could be used if a plurality of mirrors can be controlled within a second area to implement multiple grating structures corresponding to different mirrors in the second area having different tilt angles.

As used herein, an "optical device" or "optical node" may include, for example, one or more optical data processing and/or optical traffic transfer devices, such as a data center interconnect node, an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), etc.), an optical source device (e.g., a laser source), an optical destination device (e.g., a laser sink), an optical multiplexer, an optical de-multiplexer, an optical transmitter, an optical receiver, an optical transceiver, a photonic integrated circuit, an integrated optical circuit, a 1×N WSS, an M×N WSS, or the like.

As used herein, the term component is intended to be broadly construed as hardware, firmware, or a combination of hardware and software, except in respect of the term wavelength component.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "group" or "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a switching engine, an optical signal,
      the optical signal carrying a super-channel that includes a plurality of sub-carriers to be directed toward respective output ports,
      the plurality of sub-carriers being spectrally adjacent, and
      the super-channel having reduced guard band between the plurality of sub-carriers, and
      the switching engine having a plurality of regions of pixels on which respective sub-carriers, of the plurality of sub-carriers, are incident,
         the plurality of regions of pixels including first areas that do not include overlap between any two regions of pixels, of the plurality of regions of pixels, and
         the plurality of regions of pixels including one or more second areas that include overlap between regions of pixels of the plurality of regions of pixels;
   applying, by the switching engine, respective single beam steering gratings to the first areas;
   applying, by the switching engine, one or more respective pluralities of beam steering gratings to the one or more second areas; and
   directing, based on the single beam steering gratings and the one or more pluralities of beam steering gratings, parts of the optical signal toward the respective output ports.

2. The method of claim 1, where each second area, of the one or more second areas, is defined based on an overlap between a respective pair of regions of pixels of the plurality of regions of pixels; and
   where directing the parts of the optical signal to the output ports comprises:
      directing, based on the one or more respective pluralities of beam steering gratings, parts of the optical signal corresponding to a pair of sub-carriers, of the plurality of sub-carriers to output ports, of the plurality of output ports, corresponding to the pair of sub-carriers,
         the pair of sub-carriers being associated with the respective pair of regions of pixels.

3. The method of claim 1, where each first area, of the first areas, corresponds to a different sub-carrier of the plurality of sub-carriers; and
   where directing the parts of the optical signal to the output ports comprises:
      attenuating, based on the single beam steering gratings, portions of the optical signal corresponding to the sub-carriers corresponding to the first areas,
         the portions of the optical signal being included in the parts of the optical signal.

4. The method of claim 3, where attenuating the portions of the optical signal corresponding to the sub-carriers corresponding to the first areas comprises:
   attenuating the portions of the optical signal based on a measurement from an optical channel monitor or based on a configuration setting stored by a controller of the switching engine.

5. The method of claim 1, where each region of pixels is centered on a different optical sub-carrier of the plurality of sub-carriers.

6. The method of claim 1, where an adjacent pair of sub-carriers, of the plurality of sub-carriers, is not separated by a guard band.

7. The method of claim 6, where the plurality of sub-carriers include a first sub-carrier, a second sub-carrier, and a third sub-carrier,
the first sub-carrier and the second sub-carrier being adjacent, and
the second sub-carrier and the third sub-carrier being adjacent; and
where an entirety of a region of pixels, of the plurality of regions of pixels, corresponding to the second sub-carrier, is overlapped by one or more of:
a region of pixels corresponding to the first sub-carrier, or
a region of pixels corresponding to the third sub-carrier.

8. A method, comprising:
receiving a plurality of optical channels on multiple input ports to be directed to an output port to form a super-channel comprising the plurality of optical channels having sequential wavelengths with no gap between the sequential wavelengths;
directing the plurality of optical channels to a switching array,
the plurality of optical channels being associated with a corresponding plurality of regions of pixels of the switching array,
at least two regions of pixels, of the plurality of regions of pixels, being partially overlapped;
applying a plurality of beam steering gratings to the corresponding plurality of regions of pixels,
the plurality of beam steering gratings including single beam steering gratings in first areas where the plurality of regions of pixels do not overlap, and
the plurality of beam steering gratings including multiple beam steering gratings in one or more second areas where the plurality of regions of pixels overlap; and
directing, by the switching array and based on the plurality of beam steering gratings, part of the plurality of optical channels to the output port as the super-channel.

9. The method of claim 8, where each region of pixels, of the plurality of regions of pixels, is centered on a corresponding optical channel, of the plurality of optical channels.

10. The method of claim 9, where each region of pixels, of the plurality of regions of pixels, overlaps at least one other region of pixels by up to approximately 50 percent of a bandwidth of the other region of pixels.

11. The method of claim 8, where directing the part of the plurality of the optical channels to the output port comprises:
attenuating, using the single beam steering gratings, portions of the plurality of optical channels that are incident on the first areas,
the portions of the plurality of optical channels being included in the part of the plurality of the optical channels.

12. The method of claim 11, where the portions of the plurality of optical channels are first portions; and
where attenuating the first portions comprises:
attenuating the first portions to cause insertion loss of the first portions to approximately match insertion loss of second portions of the plurality of optical channels,
the second portions of the plurality of optical channels being included in the part of the plurality of the optical channels, and
the second portions of the plurality of optical channels being directed to the output port based on the multiple beam steering gratings.

13. The method of claim 8, further comprising:
causing central frequencies of the plurality of optical channels to be adjusted based on a channel spacing associated with sub-carriers of the super-channel.

14. The method of claim 13, where adjusting the central frequencies further comprises:
causing the plurality of optical channels to be received at Nyquist channel spacing.

15. An optical device, comprising:
an input port to receive an optical signal carrying a super-channel including a plurality of sub-carriers,
the plurality of sub-carriers being spectrally adjacent, and
the super-channel having reduced guard band between the plurality of sub-carriers;
a phased array switching engine to:
direct the plurality of sub-carriers to a switching array of the phased array switching engine,
the plurality of sub-carriers to be associated with a respective plurality of regions of pixels of the switching array,
first areas of the switching array to be associated with a single region of pixels corresponding to a single sub-carrier of the plurality of sub-carriers, and
second areas of the switching array to be associated with overlapping regions of pixels corresponding to adjacent pairs of sub-carriers of the plurality of sub-carriers;
apply, to the switching array, beam steering gratings corresponding to the plurality of sub-carriers,
the beam steering grating for a particular optical sub-carrier, of the plurality of optical sub-carriers, to be approximately coextensive with the region of pixels, of the plurality of regions of pixels, corresponding to the particular optical sub-carrier; and
direct, based on the beam steering gratings, parts of the plurality of optical sub-carriers to respective output ports.

16. The optical device of claim 15, where the first areas are to be associated with single beam steering gratings; and
where the second areas are to be associated with pairs of beam steering gratings corresponding to the adjacent pairs of sub-carriers.

17. The optical device of claim 16, where a first sub-carrier and a second sub-carrier, of one of the adjacent pairs of sub-carriers, are to be associated with a corresponding first output port and second output port; and
where the phased array switching engine, when directing the parts of the plurality of optical sub-carriers to the output ports, is to:
direct, based on a pair of beam steering gratings corresponding to the first sub-carrier and the second sub-carrier, first portions of the first sub-carrier and the second sub-carrier to the first output port; and
direct, based on the pair of beam steering gratings, second portions of the first sub-carrier and the second sub-carrier to the second output port.

18. The optical device of claim 15, where the phased array switching engine, when applying the beam steering gratings, is to:
cause the beam steering gratings associated with the first areas to attenuate portions of the plurality of sub-carriers that are incident on the first areas,
the portions of the plurality of sub-carriers being included in the parts of the plurality of sub-carriers.

19. The optical device of claim 15, where the phased array switching engine, when directing the parts of the plurality of optical sub-carriers to the output ports, is to:
- direct first portions of the plurality of optical sub-carriers that are incident on the first areas to respective single output ports; and
- direct second portions of the plurality of optical sub-carriers that are incident on the second areas to respective pairs of output ports,
  - the pairs of output ports corresponding to the adjacent pairs of sub-carriers corresponding to the second areas.

20. The optical device of claim 15, where each sub-carrier, of the plurality of sub-carriers, is associated with a respective first area, of the first areas.

* * * * *